US012290944B2

(12) United States Patent
Yu et al.

(10) Patent No.: US 12,290,944 B2
(45) Date of Patent: May 6, 2025

(54) ROBOTIC SYSTEM WITH IMAGE-BASED SIZING MECHANISM AND METHODS FOR OPERATING THE SAME

(71) Applicant: MUJIN, Inc., Tokyo (JP)

(72) Inventors: Jinze Yu, Tokyo (JP); Jose Jeronimo Moreira Rodrigues, Tokyo (JP); Rosen Nikolaev Diankov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 250 days.

(21) Appl. No.: 17/732,271

(22) Filed: Apr. 28, 2022

(65) Prior Publication Data

US 2023/0041343 A1 Feb. 9, 2023

Related U.S. Application Data

(60) Provisional application No. 63/231,210, filed on Aug. 9, 2021.

(51) Int. Cl.
| | |
|---|---|
| *B25J 13/08* | (2006.01) |
| *B25J 9/16* | (2006.01) |
| *G01B 11/06* | (2006.01) |
| *G01B 11/24* | (2006.01) |
| *G06Q 10/08* | (2024.01) |
| *G06T 7/254* | (2017.01) |

(52) U.S. Cl.
CPC ........... *B25J 9/1697* (2013.01); *B25J 9/1638* (2013.01); *B25J 9/1687* (2013.01); *B25J 13/089* (2013.01)

(58) Field of Classification Search
CPC ...... B25J 9/1697; B25J 9/1638; B25J 9/1687; B25J 13/089; G01B 11/0608; G01B 11/24; G06Q 10/08; G06T 2200/04; G06T 2207/10028; G06T 2207/30164; G06T 7/254

See application file for complete search history.

(56) References Cited

U.S. PATENT DOCUMENTS

| | | |
|---|---|---|
| 4,907,169 A | 3/1990 | Lovoi |
| 5,812,395 A | 9/1998 | Mascianegelo et al. |
| 6,272,230 B1 | 8/2001 | Hiraoglu |
| 6,290,454 B1 | 9/2001 | Huang et al. |
| 7,085,622 B2 | 8/2006 | Sadighi et al. |
| 7,646,917 B2 | 1/2010 | Jung et al. |
| 7,724,448 B2 | 5/2010 | Watanabe |
| 8,442,297 B2 | 5/2013 | Tyler et al. |
| 8,517,928 B2 | 8/2013 | Orihara |
| 9,050,719 B2 | 6/2015 | Valpola et al. |

(Continued)

FOREIGN PATENT DOCUMENTS

| | | |
|---|---|---|
| CN | 1293752 A | 5/2001 |
| CN | 1135201 C | 1/2004 |

(Continued)

OTHER PUBLICATIONS

USPTO Final Office Action mailed Apr. 18, 2019 for U.S. Appl. No. 16/290,741, filed Mar. 1, 2019, 16 pages.

(Continued)

*Primary Examiner* — Adam R Mott
*Assistant Examiner* — Heather J Keniry
(74) *Attorney, Agent, or Firm* — Perkins Coie LLP

(57) ABSTRACT

A system and method for estimating aspects of target objects and/or associated task implementations is disclosed.

20 Claims, 6 Drawing Sheets

(56) References Cited

U.S. PATENT DOCUMENTS

| | | |
|---|---|---|
| 9,067,744 B2 | 6/2015 | Takizawa et al. |
| 9,102,055 B1 * | 8/2015 | Konolige ............... B25J 9/1612 |
| 9,227,323 B1 | 1/2016 | Konolige et al. |
| 9,233,470 B1 | 1/2016 | Bradski et al. |
| 9,272,417 B2 | 3/2016 | Konolige et al. |
| 9,314,924 B1 | 4/2016 | Laurent et al. |
| 9,327,406 B1 | 5/2016 | Hinterstoisser |
| 9,486,921 B1 | 11/2016 | Straszheim et al. |
| 9,630,320 B1 | 4/2017 | Konolige et al. |
| 9,630,321 B2 | 4/2017 | Bradski et al. |
| 9,757,858 B2 | 9/2017 | Eto et al. |
| 9,796,540 B1 | 10/2017 | Shellenbaum et al. |
| 9,862,093 B2 | 1/2018 | Bradski et al. |
| 9,875,427 B2 | 1/2018 | Medasani et al. |
| 10,124,489 B2 | 11/2018 | Chitta et al. |
| 10,147,398 B2 | 12/2018 | Koga |
| 10,328,578 B2 | 6/2019 | Holz |
| 10,369,701 B1 | 8/2019 | Diankov et al. |
| 10,471,597 B1 | 11/2019 | Murphy et al. |
| 10,518,410 B2 | 12/2019 | Bradski et al. |
| 10,562,188 B1 | 2/2020 | Diankov et al. |
| 10,562,189 B1 | 2/2020 | Diankov et al. |
| 10,614,340 B1 | 4/2020 | Yu et al. |
| 10,625,952 B1 | 4/2020 | Luthra et al. |
| 10,703,584 B2 | 7/2020 | Diankov et al. |
| 11,034,025 B2 | 6/2021 | Diankov et al. |
| 11,062,457 B2 | 7/2021 | Diankov et al. |
| 11,068,679 B2 | 7/2021 | Rodriguez et al. |
| 11,176,674 B2 | 11/2021 | Diankov et al. |
| 11,189,033 B2 | 11/2021 | Diankov et al. |
| 11,288,810 B2 | 3/2022 | Diankov et al. |
| 11,436,748 B2 * | 9/2022 | Liu .................... H04N 13/254 |
| 11,482,045 B1 * | 10/2022 | Kim .................... G06V 20/52 |
| 11,501,445 B2 | 11/2022 | Diankov et al. |
| 11,541,545 B2 | 1/2023 | Yamada et al. |
| 11,636,605 B2 | 4/2023 | Yu et al. |
| 11,780,101 B2 | 10/2023 | Diankov et al. |
| 11,797,926 B2 | 10/2023 | Diankov et al. |
| 11,961,042 B2 | 4/2024 | Yu et al. |
| 12,002,007 B2 | 6/2024 | Diankov et al. |
| 2002/0106273 A1 | 8/2002 | Huang et al. |
| 2007/0177011 A1 | 8/2007 | Lewin et al. |
| 2007/0177790 A1 | 8/2007 | Ban et al. |
| 2009/0028686 A1 | 1/2009 | Tallis et al. |
| 2009/0138121 A1 | 5/2009 | Wicks et al. |
| 2010/0004778 A1 | 1/2010 | Arimatsu et al. |
| 2010/0082152 A1 | 4/2010 | Mishra et al. |
| 2010/0222915 A1 | 9/2010 | Kuehnemann et al. |
| 2011/0216185 A1 | 9/2011 | Laws et al. |
| 2011/0218670 A1 | 9/2011 | Bell et al. |
| 2013/0096713 A1 | 4/2013 | Takizawa et al. |
| 2013/0211593 A1 | 8/2013 | Domae et al. |
| 2014/0052555 A1 | 2/2014 | MacIntosh |
| 2015/0066199 A1 | 3/2015 | Shimono |
| 2015/0203304 A1 | 7/2015 | Morency et al. |
| 2015/0262012 A1 | 9/2015 | Kim et al. |
| 2016/0016311 A1 | 3/2016 | Konolige et al. |
| 2016/0089791 A1 | 3/2016 | Bradski et al. |
| 2016/0136808 A1 * | 5/2016 | Konolige ............... B25J 9/1612 |
| | | 700/214 |
| 2017/0003113 A1 | 1/2017 | Pettersson |
| 2017/0057146 A1 | 3/2017 | Altonen et al. |
| 2017/0057148 A1 | 3/2017 | Altonen et al. |
| 2017/0076469 A1 | 3/2017 | Sonoura et al. |
| 2017/0137236 A1 | 5/2017 | Sonoura et al. |
| 2017/0177746 A1 | 6/2017 | Gotou |
| 2017/0246744 A1 | 8/2017 | Chitta et al. |
| 2018/0126553 A1 | 5/2018 | Corkum et al. |
| 2018/0198983 A1 | 7/2018 | Fukuya et al. |
| 2018/0243904 A1 | 8/2018 | Bradski |
| 2018/0253516 A1 | 9/2018 | Shimano et al. |
| 2018/0304468 A1 | 10/2018 | Holz |
| 2019/0206059 A1 | 7/2019 | Landman |
| 2020/0078938 A1 * | 3/2020 | Bradski .................. B25J 9/1697 |
| 2020/0122344 A1 * | 4/2020 | Lee ........................ B25J 9/1697 |
| 2020/0130962 A1 | 4/2020 | Yu et al. |
| 2020/0130963 A1 | 4/2020 | Diankov et al. |
| 2020/0134828 A1 | 4/2020 | Diankov et al. |
| 2020/0134830 A1 | 4/2020 | Yu et al. |
| 2020/0139553 A1 | 5/2020 | Diankov et al. |
| 2020/0279084 A1 | 9/2020 | Davis et al. |
| 2020/0294244 A1 | 9/2020 | Diankov et al. |
| 2020/0302207 A1 | 9/2020 | Perkins et al. |
| 2020/0334835 A1 * | 10/2020 | Buibas .................. G06V 20/64 |
| 2020/0377315 A1 * | 12/2020 | Diankov ............... B65G 47/90 |
| 2021/0129334 A1 | 5/2021 | Kanunikov |
| 2021/0158609 A1 | 5/2021 | Raskob et al. |
| 2021/0260771 A1 | 8/2021 | Diankov et al. |
| 2021/0304416 A1 | 9/2021 | Yu et al. |
| 2021/0383550 A1 | 12/2021 | Yu et al. |
| 2022/0051411 A1 | 2/2022 | Diankov et al. |
| 2022/0076425 A1 | 3/2022 | Yu et al. |
| 2022/0157063 A1 * | 5/2022 | Bronicki ............ G06Q 30/0639 |
| 2022/0203547 A1 * | 6/2022 | Majumdar ................ G06T 7/73 |
| 2022/0261738 A1 * | 8/2022 | Kumar ............... G06Q 10/0833 |
| 2022/0292278 A1 | 9/2022 | Roberts et al. |
| 2022/0305680 A1 * | 9/2022 | Turpin .................. B25J 19/023 |
| 2023/0008540 A1 | 1/2023 | Diankov et al. |
| 2023/0027984 A1 | 1/2023 | Rodrigues |
| 2023/0041343 A1 | 2/2023 | Yu et al. |
| 2023/0150777 A1 * | 5/2023 | Skyum ..................... B07C 5/02 |
| | | 700/245 |
| 2023/0415360 A1 | 12/2023 | Diankov et al. |
| 2024/0020637 A1 | 1/2024 | Yu et al. |
| 2024/0078512 A1 | 3/2024 | Diankov et al. |

FOREIGN PATENT DOCUMENTS

| | | |
|---|---|---|
| CN | 1791475 A | 6/2006 |
| CN | 102616578 A | 8/2012 |
| CN | 202539084 U | 11/2012 |
| CN | 103568024 A | 2/2014 |
| CN | 103822594 A | 5/2014 |
| CN | 104608150 A | 5/2015 |
| CN | 103043359 A | 7/2015 |
| CN | 105817430 A | 8/2016 |
| CN | 106063998 A | 11/2016 |
| CN | 106660207 A | 5/2017 |
| CN | 106886165 | 6/2017 |
| CN | 106945035 A | 7/2017 |
| CN | 107889452 A | 4/2018 |
| CN | 108349083 A | 7/2018 |
| CN | 111566028 A | 8/2020 |
| CN | 111629868 A | 9/2020 |
| DE | 102014016069 A1 | 5/2015 |
| DE | 102015106936 A2 | 11/2015 |
| JP | 02269587 A | 11/1990 |
| JP | 03234491 A | 10/1991 |
| JP | H03234491 A | 10/1991 |
| JP | H06171760 A | 6/1994 |
| JP | 07053054 A | 2/1995 |
| JP | 2007097057 A | 4/1995 |
| JP | H0797057 A | 4/1995 |
| JP | 07299782 A | 11/1995 |
| JP | H07291450 A | 11/1995 |
| JP | 10031742 A | 2/1998 |
| JP | 2894449 B2 | 5/1999 |
| JP | 11157609 A | 6/1999 |
| JP | 11333770 A | 12/1999 |
| JP | 2001058723 A | 3/2001 |
| JP | 2001072247 A | 3/2001 |
| JP | 2002013913 A | 1/2002 |
| JP | 3277739 A | 4/2002 |
| JP | 2003237943 A | 8/2003 |
| JP | 2004050390 A | 2/2004 |
| JP | 3596434 B2 | 12/2004 |
| JP | 2005333824 A | 12/2005 |
| JP | 3849514 B2 | 11/2006 |
| JP | 2006300929 A | 11/2006 |
| JP | 2007254128 A | 10/2007 |
| JP | 2008284690 A | 11/2008 |
| JP | 2010247959 A | 11/2010 |
| JP | 2013129034 A | 7/2013 |
| JP | 2013145525 A | 7/2013 |

(56) References Cited

FOREIGN PATENT DOCUMENTS

| | | | |
|---|---|---|---|
| JP | 2013246589 | A | 12/2013 |
| JP | 5429614 | B2 | 2/2014 |
| JP | 2017058130 | A | 3/2017 |
| JP | 2017097847 | A | 6/2017 |
| JP | 2017520418 | A | 7/2017 |
| JP | 2017149569 | A | 8/2017 |
| JP | 2018047544 | A | 3/2018 |
| JP | 2018097889 | A | 6/2018 |
| JP | 6374993 | B2 | 8/2018 |
| JP | 2018131237 | A | 8/2018 |
| JP | 2018158439 | A | 10/2018 |
| JP | 6461712 | B2 | 1/2019 |
| JP | 2019005871 | A | 1/2019 |
| JP | 6486114 | B2 | 3/2019 |
| JP | 2019509559 | A | 4/2019 |
| JP | 2019136828 | A | 8/2019 |
| JP | 2020069636 | A | 5/2020 |
| JP | 2020196117 | A | 12/2020 |
| JP | 2021022364 | A | 2/2021 |
| JP | 2021507857 | A | 2/2021 |
| JP | 2021030386 | A | 3/2021 |
| JP | 7175487 | B1 | 11/2022 |
| WO | 2017146895 | A1 | 8/2017 |
| WO | 2018131237 | A1 | 7/2018 |
| WO | 2018185861 | A1 | 10/2018 |

OTHER PUBLICATIONS

USPTO Notice of Allowance mailed Jun. 7, 2019 for U.S. Appl. No. 16/290,741, filed Mar. 1, 2019, 8 pages.
USPTO Non-Final Office Action mailed Jul. 12, 2019 for U.S. Appl. No. 16/443,743, filed Jun. 17, 2019, 11 pages.
USPTO Notice of Allowance mailed Oct. 9, 2019 for U.S. Appl. No. 16/443,743, filed Jun. 17, 2019, 12 pages.
USPTO Non-Final Office Action mailed Jul. 15, 2019 for U.S. Appl. No. 16/443,757, filed Jun. 17, 2019, 12 pages.
USPTO Notice of Allowance mailed Oct. 7, 2019 for U.S. Appl. No. 16/443,757, filed Jun. 17, 2019, 12 pages.
USPTO Non-Final Office Action mailed Nov. 14, 2019 for U.S. Appl. No. 16/539,790, filed Aug. 13, 2019, 16 pages.
Korean Intellectual Property Office, International Application Division, International Search Report and Written Opinion for PCT/US2019/035608 filed Jun. 5, 2018, mailed Aug. 29, 2019, 9 pages.
Japanese Patent Office, Notice of Reasons for Rejection for Japanese Application No. 2019-133517, mailed Nov. 18, 2019, with English translation, 6 pages.
International Search Report and Written Opinion mailed Feb. 17, 2020 for PCT/US2019/058650 filed Oct. 29, 2019, ISA/KR, 12 pages.
USPTO Notice of Allowance mailed Mar. 9, 2020 for U.S. Appl. No. 16/539,790, filed Aug. 13, 2019, 19 pages.
Jia, Tong et al., "Depth Measurement Based on Infrared Coded Structured Light," Hindawi Publishing Corporation, Journal of Sensors, vol. 2014, Article ID 852261, 8 pages, published Oct. 19, 2014.
Japanese Patent Office, Decision to Grant Japanese Application No. 2019-133517, mailed Mar. 17, 2020, 3 pages.
Japanese Patent Office, Notice of Reasons for Rejection for Japanese Application No. 2020-515142, mailed Nov. 9, 2020, with English translation, 13 pages.
CNIPA Office Action mailed Jul. 2, 2020 for Application No. 201910597137.2, 5 pages.
CNIPA Office Action mailed Jan. 7, 2021 for Application No. 201910597137.2, 3 pages.
Japanese Patent Office, Decision to Grant Japanese Application No. 2020-515142, mailed Dec. 7, 2020, 3 pages.
USPTO Notice of Allowance mailed Feb. 10, 2021 for U.S. Appl. No. 16/736,667, filed Jan. 7, 2020, First Inventor: Rosen Diankov, 23 pages.
CNIPA Office Action mailed Mar. 3, 2021 for Application No. 202010482376.6, 11 pages.
German Patent Office Office Action mailed Nov. 18, 2020 for Application No. 112019000125.6, 7 pages.
German Patent Office Decision to Grant mailed Mar. 16, 2021 for Application No. 112019000125.6, 6 pages.
Holz et al., Fast Edge-Based Detection and Localization of Transport Boxes and Pallets in RGB-D Images for Mobile Robot Bin Picking, ISR 2016, Jun. 21-22, 2016, Munich, Germany, pp. 133-140, Year: 2016.
Holz et al., "Real-Time Object Detection, Localization and Verification of Fast Robotic Depalletizing," 978-1-4799-9994-1, IEEE 2015, pp. 1459-1466, Year: 2015.
Doliotis et al., "A 3D Perception-based Robotic Manipulation System for Automated Truck Unloading," 978-1-5090-2409-4, IEEE 2016, pp. 262-267, Year: 2016.
International Bureau of WIPO, PCT International Preliminary Report on Patentability for PCT/US2019/035608 filed Jun. 5, 2019, mailed May 14, 2021, 6 pages.
International Bureau of WIPO, PCT International Preliminary Report on Patentability for PCT/US2019/058650 filed Oct. 29, 2019, mailed May 14, 2021, 9 pages.
CNIPA Notice to Grant mailed May 21, 2021 for Application No. 202010482376.6, 4 pages.
USPTO Non-Final Office Action mailed Jul. 21, 2021 for U.S. Appl. No. 16/888,376, filed May 29, 2020, 40 pages.
USPTO Notice of Allowance mailed Nov. 5, 2021 for U.S. Appl. No. 16/888,376, filed May 29, 2020, 13 pages.
German Patent Office Office Action mailed Mar. 16, 2022 for Application No. 112019000217.1, 8 pages.
USPTO Non-Final Office Action mailed Dec. 12, 2022 for U.S. Appl. No. 17/313,921, filed May 6, 2021, First Named Inventor: Rosen Diankov, 20 pages.
Japanese Patent Office, Notice of Reasons for Rejection mailed Jul. 22, 2022 for Application No. 2022-097954, Applicant: Mujin, Inc., 14 pages.
Japanese Patent Office, Notice of Reasons for Rejection mailed Aug. 25, 2022 for Application No. 2022-097954, Applicant: Mujin, Inc., 8 pages.
Japanese Patent Office, Decision to Grant Japanese Application No. 2022-097954, mailed Oct. 4, 2022, 3 pages.
USPTO Notice of Allowance mailed May 30, 2023 for U.S. Appl. No. 17/313,921, filed May 6, 2021, First Named Inventor: Rosen Diankov, 26 pages.
Japanese Patent Office, Notice of Reasons for Rejection for Japanese Application No. 2020-072681, mailed Jun. 26, 2023, with English translation, 6 pages.
KIPO Notice of Reasons for Rejection mailed Jun. 30, 2023 for Application No. 9-5-2023-059249101, 3 pages.
KIPO Notice of Reasons for Rejection mailed Jun. 30, 2023 for Application No. 9-5-2023-059249246, 4 pages.
Japanese Patent Office, Office Action for Japanese Application No. 2020-216162, mailed Aug. 5, 2023, 5 pages.
Japanese Patent Office, Decision to Grant Japanese Application No. 2020-072681, mailed Oct. 19, 2023, 3 pages.
KIPO Notice of Allowance mailed Dec. 29, 2023 for Application No. 10-2021-7016615, 4 pages.
Hashimoto, Manabu et al., "Vision System for Object Handling Robot Using a Low-Resolution Range Image and an Intensity Image," Transactions of the Institute of Electronics, Information and Communication Engineers, Japan, Jun. 1, 2001, vol. J84-DII, No. 6, pp. 985-993.
KIPO Notice of Allowance mailed Dec. 19, 2023 for Application No. 10-2021-7016611, 3 pages.
Japanese Patent Office, Decision to Grant Japanese Application No. 2020-216162, mailed Jan. 31, 2024 3 pages.
KIPO Notice of Reasons for Rejection mailed Jun. 28, 2024 for Korean patent application No. 10-2024-7009032.
Japanese Patent Office, Decision to Grant for Japanese Application No. 2022-095385, dated Jul. 14, 2022, 3 pages.

* cited by examiner

ROBOTIC SYSTEM WITH IMAGE-BASED SIZING MECHANISM AND METHODS FOR OPERATING THE SAME

RELATED APPLICATIONS

This application claims the benefit of U.S. Provisional Patent Application Ser. No. 63/231,210, filed Aug. 9, 2021, which is incorporated herein by reference in its entirety.

This application contains subject matter related to U.S. patent application Ser. No. 16/290,741, filed Mar. 1, 2019, now U.S. Pat. No. 10,369,701; U.S. patent application Ser. No. 16/443,743, filed Jun. 17, 2019, now U.S. Pat. No. 10,562,188; U.S. patent application Ser. No. 16/443,757, filed Jun. 17, 2019, now U.S. Pat. No. 10,562,189; U.S. patent application Ser. No. 16/736,667, filed Jan. 7, 2020, now U.S. Pat. No. 11,034,025; U.S. patent application Ser. No. 17/313,921, filed May 6, 2021; U.S. patent application Ser. No. 16/539,790, filed Aug. 13, 2019, now U.S. Pat. No. 10,703,584; and U.S. patent application Ser. No. 16/888,376, filed May 29, 2020. The subject matter of all these applications is incorporated herein by reference.

This application also contains subject matter related to U.S. patent application Ser. No. 17/232,302 titled "ROBOTIC SYSTEM WITH DEPTH-BASED PROCESSING MECHANISM AND METHODS FOR OPERATING THE SAME," filed concurrently herein, the subject matter of which is incorporated herein by reference.

TECHNICAL FIELD

The present technology is directed generally to robotic systems and, more specifically, robotic systems with image-based object sizing mechanisms.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate the human sensitivity, flexibility, and/or adaptability required for analyzing and executing more complex tasks. For example, robots often have difficulty extrapolating multiple conclusions and/or generalizations based on limited information. Accordingly, there remains a need for improved robotic systems and techniques for extrapolating conclusions and/or generalizations.

DETAILED DESCRIPTION

Figure 1:
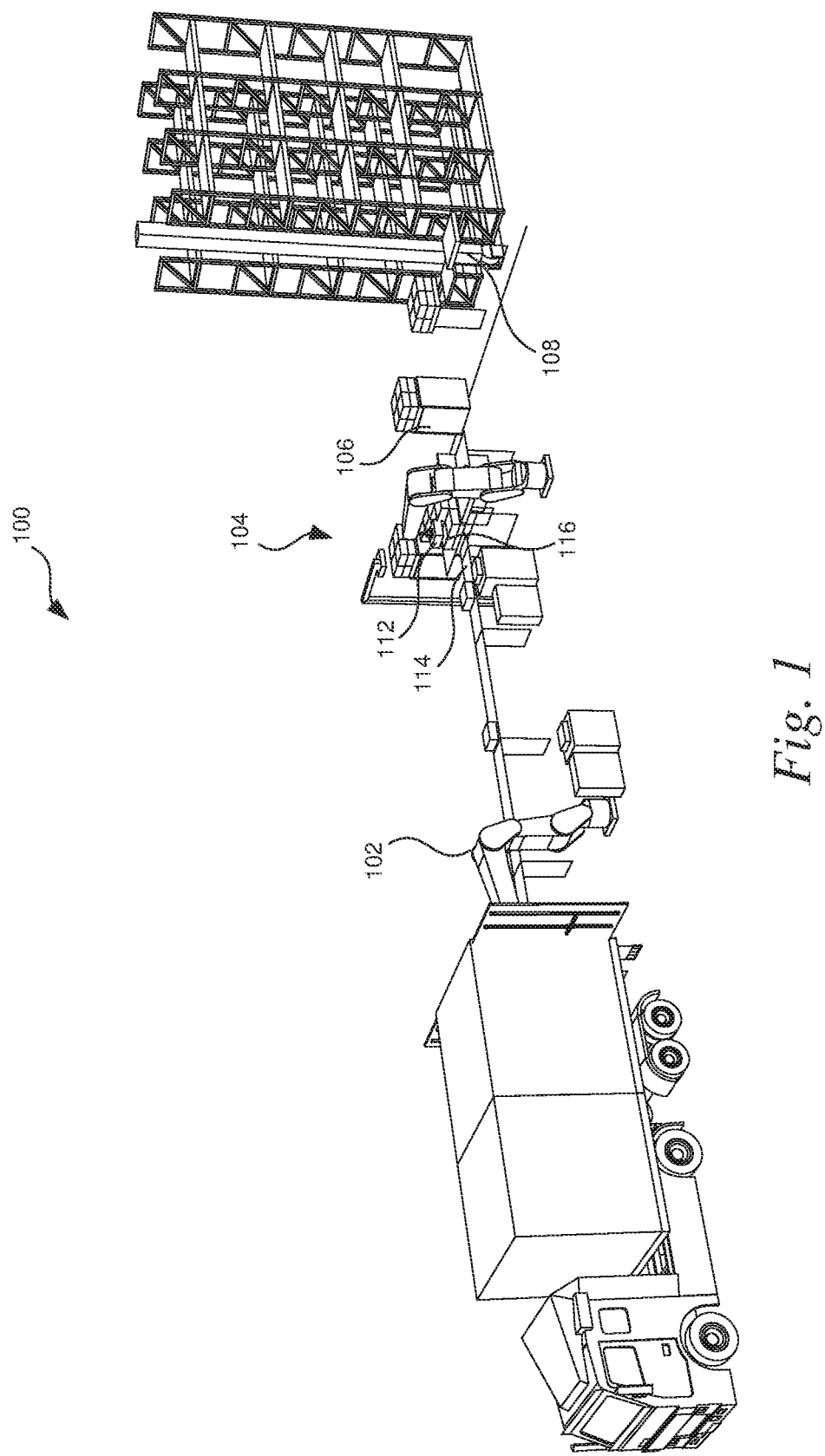
FIG. 1 illustrates an example environment in which a robotic system transports objects in accordance with one or more embodiments of the present technology.

Systems and methods for deriving estimations based on one or more images (e.g., two-dimensional (2D) visual depictions, three-dimensional (3D) depth measures, or the like) captured during or between task execution(s) are described herein. In some embodiments, a robotic system may be configured to transfer one or more objects (e.g., boxes, packages, objects, etc.) from a start location (e.g., a pallet, a bin, a conveyor, etc.) to a task location (e.g., a different pallet, bin, conveyor, etc.). The robotic system can obtain a set or a sequence of image data (e.g., 2D depictions and/or depth maps) depicting the start location and/or the task location during and/or across transfers of the corresponding objects. The robotic system can use the image data to estimate and/or derive various aspects of the transferred object(s), such as one or more dimensions (e.g., a height) of the transferred object(s).

In the following, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, or the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable media, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 transports objects in accordance with one or more embodiments of the present technology. The robotic system 100 can include and/or communicate with one or more units (e.g., robots) configured to execute one or more tasks. Aspects of the object detection/update can be practiced or implemented by the various units.

For the example illustrated in FIG. 1, the robotic system 100 can include and/or communicate with an unloading unit 102, a transfer unit 104 or a transfer assembly (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, a sequence for transferring the objects, and/or corresponding motion plans) for placing and/or stacking the objects. Each of the units can be configured to execute a sequence of actions (e.g., by operating one or more components therein) according to one or more of the derived plans to execute a task.

In some embodiments, the task can include manipulation (e.g., moving and/or reorienting) of a target object 112 (e.g., one of the packages, boxes, cases, cages, pallets, etc., corresponding to the executing task), such as to move the target object 112 from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (e.g., by moving the pallet carrying the target object 112) from the transfer unit 104 to a storage location (e.g., a location on the shelves).

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include and/or communicate with other units, such as manipulators, service robots, modular robots, etc., not shown in FIG. 1. For example, in some embodiments, other units can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

The robotic system 100 can include and/or be coupled to physical or structural members (e.g., robotic manipulator arms) that are connected at joints for motion (e.g., rotational and/or translational displacements). The structural members and the joints can form a kinetic chain configured to manipulate an end effector (e.g., the gripper) configured to execute one or more tasks (e.g., gripping, spinning, welding, etc.) depending on the use/operation of the robotic system 100. The robotic system 100 can include and/or communicate with the actuation devices (e.g., motors, actuators, wires, artificial muscles, electroactive polymers, etc.) configured to drive or manipulate (e.g., displace and/or reorient) the structural members about or at a corresponding joint. In some embodiments, the robotic units can include transport motors configured to transport the corresponding units/chassis from place to place.

The robotic system 100 can include and/or communicate with sensors configured to obtain information used to implement the tasks, such as for manipulating the structural members and/or for transporting the robotic units. The sensors can include devices configured to detect or measure one or more physical properties of the robotic system 100 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

In some embodiments, for example, the sensors can include one or more imaging devices (e.g., visual and/or infrared cameras, 2D and/or 3D imaging cameras, distance measuring devices such as lidars or radars, etc.) configured to detect the surrounding environment. The imaging devices can generate representations of the detected environment, such as digital images and/or point clouds, that may be processed via machine/computer vision (e.g., for automatic inspection, robot guidance, or other robotic applications). The robotic system 100 can process the digital image and/or the point cloud to identify the target object 112, the start location 114, the task location 116, a pose of the target object 112, or a combination thereof.

For manipulating the target object 112, the robotic system 100 can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices can include one or more cameras configured to generate images of the pickup area and/or one or more cameras configured to generate images of the task area (e.g., drop area). Based on the captured images, the robotic system 100 can determine the start location 114, the task location 116, the associated poses, a packing/placement plan, a transfer/packing sequence, and/or other processing results.

In some embodiments, for example, the sensors can include position sensors (e.g., position encoders, potentiometers, etc.) configured to detect positions of structural members (e.g., the robotic arms and/or the end effectors) and/or corresponding joints of the robotic system 100. The robotic system 100 can use the position sensors to track locations and/or orientations of the structural members and/or the joints during the execution of the task.

Robotic Systems

Figure 2:
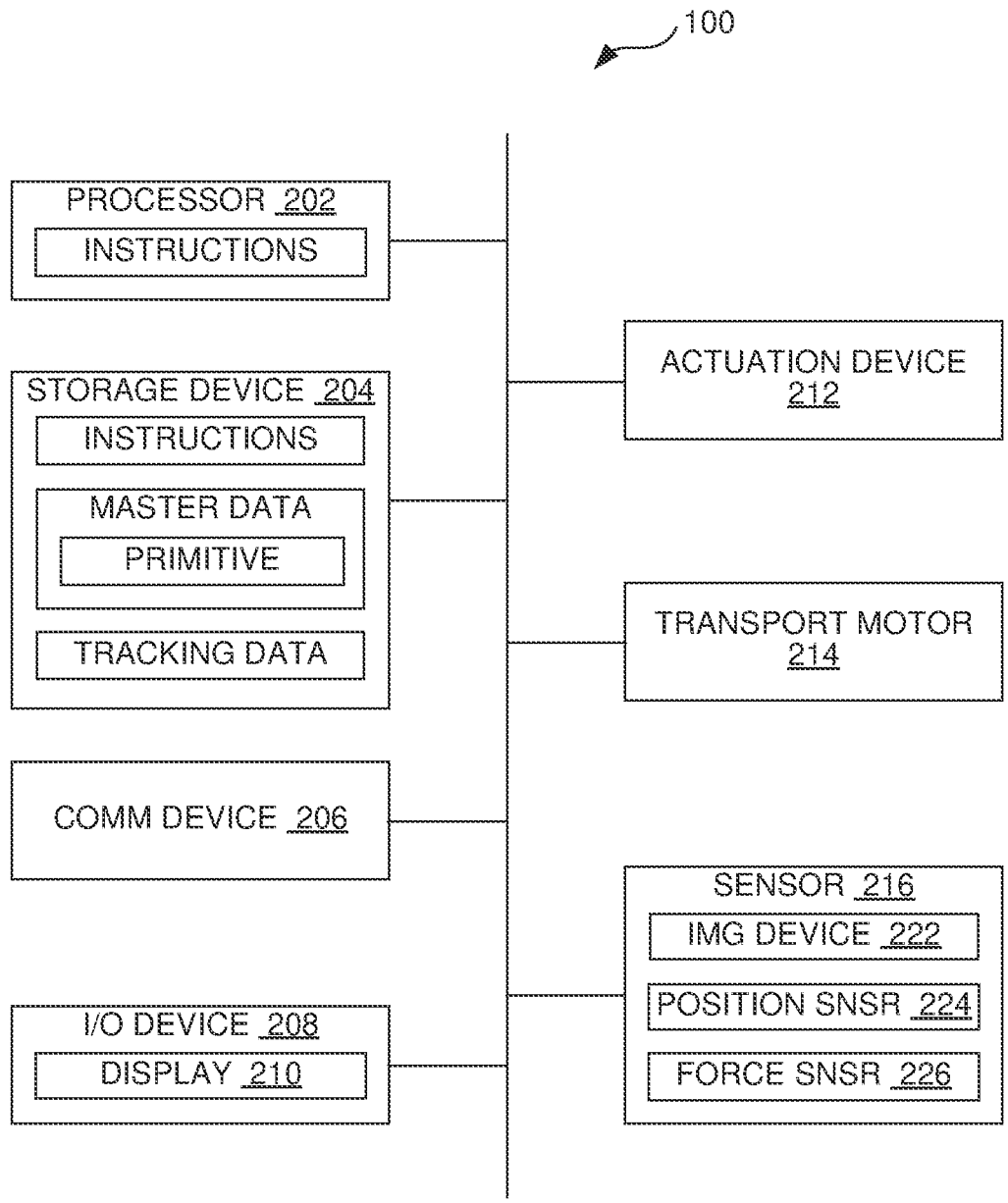
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, one or more units/components for the robotic system 100 and/or one or more of the robotic units can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include and/or communicate with bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds. For example, the storage devices 204 can store master data that includes descriptions of objects (e.g., boxes, cases, containers, and/or products) that may be manipulated by the robotic system 100. In one or more embodiments, the master data can include a dimension, a shape (e.g., one or more templates or primitives for potential poses and/or computer-generated models for recognizing the outline shape of the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. Additionally or alternatively, the storage devices 204 may also include generic primitives representative of outline shapes for different potential object shapes and/or different poses thereof. For example, the generic primitives can include outline shapes and sizes for different object shapes that are expected to be included in an object stack. In some embodiments, the master data can include manipulation-related information regarding the objects, such as a center-of-mass (CoM) location on each of the objects, expected sensor measurements (e.g., force, torque, pressure, and/or contact measurements) corresponding to one or more actions/maneuvers, or a combination thereof. The robotic system can look up pressure levels (e.g., vacuum levels, suction levels, etc.), gripping/pickup areas (e.g., areas or banks of vacuum grippers to be activated), and other stored master data for controlling transfer robots.

The storage devices 204 can also store object tracking data. In some embodiments, the object tracking data can include a log of scanned, manipulated, and/or transferred objects. In some embodiments, the object tracking data can include image data (e.g., a picture, point cloud, live video feed, etc.) of the objects at one or more locations (e.g., designated pickup or drop locations and/or conveyor belts) and/or placement locations/poses of the objects at the one or more locations. Alternatively or additionally, the object tracking data may include a transfer history that identifies the objects that were transferred between locations and/or other transfer related data (e.g., a time and/or a position within a sequence for each transferred object, an identifier for a plan implemented to transfer each object, a status of the transfer, or the like).

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., a separately encased device) can include the processors 202, storage devices 204, communication devices 206, and/or input-output devices 208. The controller can be a standalone component or part of a unit/assembly. For example, each unloading unit, transfer assembly, transport unit, and loading unit of the robotic system 100 can include one or more controllers. In some embodiments, a single controller can control multiple units or standalone components.

The robotic system 100 can include and/or communicate with physical or structural members (e.g., robotic manipulator arms) connected at joints for motion (e.g., rotational and/or translational displacements). The structural members and the joints can form a kinetic chain configured to manipulate an end effector (e.g., the gripper) configured to execute one or more tasks (e.g., gripping, spinning, welding, etc.) depending on the use/operation of the robotic system 100. The kinetic chain can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the kinetic chain can include the transport motors 214 configured to transport the corresponding units/chassis from place to place. For example, the actuation devices 212 and transport motors 214 can be connected to or part of a robotic arm, a linear slide, or other robotic components.

The sensors 216 can be configured to obtain information used to implement the tasks, such as for manipulating the structural members and/or for transporting the robotic units. The sensors 216 can include devices configured to detect or measure one or more physical properties of the controllers, the robotic units (e.g., a state, a condition, and/or a location of one or more structural members/joints thereof), and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., 2D and/or 3D imaging devices) configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image, a depth map, and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target object 112 of FIG. 1, the start location 114 of FIG. 1, the task location 116 of FIG. 1, a pose of the target object 112 of FIG. 1, or a combination thereof. The robotic system 100 can use image data from the imaging devices 222 to determine how to access and pick up objects. Images of the objects can be analyzed to determine a motion plan for positioning a vacuum gripper assembly to grip targeted objects. The robotic system 100 (e.g., via the various units) can capture and analyze an image of a designated area (e.g., inside the truck, inside the container, or a pickup location for objects on the conveyor belt) to identify the target object 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 of FIG. 2 can include position sensors 224 of FIG. 2 (e.g., position encoders, potentiometers, etc.) configured to detect positions of structural members (e.g., the robotic arms and/or the end effectors) and/or corresponding joints of the robotic system 100. The robotic system 100 can use the position sensors 224 to track locations and/or orientations of the structural members and/or the joints during the execution of the task. The unloading unit, transfer unit/assembly, transport unit, and loading unit disclosed herein can include the sensors 216.

In some embodiments, the sensors 216 can include one or more force sensors 226 (e.g., weight sensors, strain gauges, piezoresistive/piezoelectric sensors, capacitive sensors, elastoresistive sensors, and/or other tactile sensors) configured to measure a force applied to the kinetic chain, such as at the end effector. For example, the sensors 216 can be used to determine a load (e.g., the grasped object) on the robotic arm. The force sensors 226 can be attached to or about the end effector and configured such that the resulting measurements represent a weight of the grasped object and/or a torque vector relative to a reference location. In one or more embodiments, the robotic system 100 can process the torque vector, the weight, and/or other physical traits of the object (e.g., dimensions) to estimate the CoM of the grasped object.

Robotic Transfer Assembly

Figure 3:
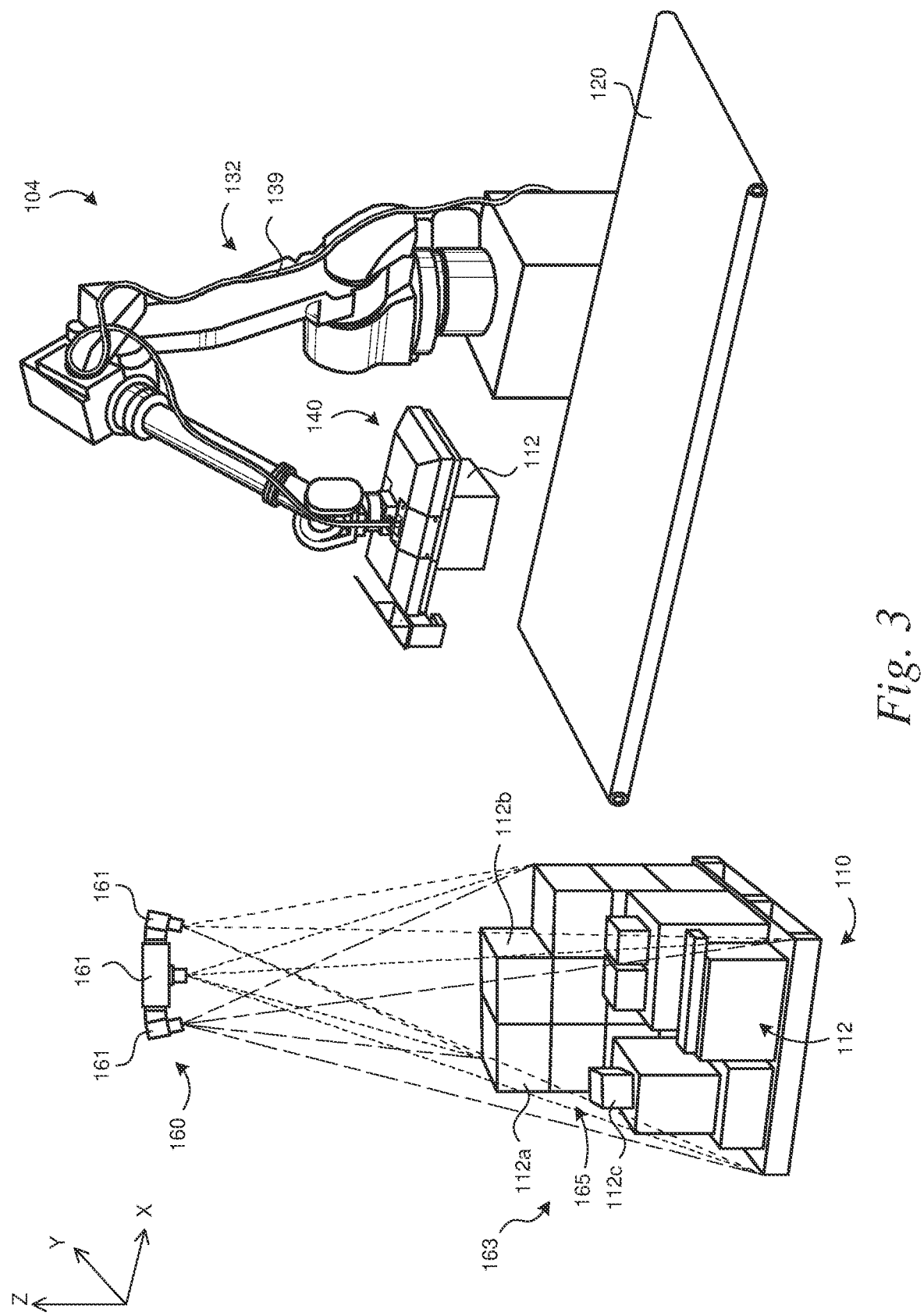
FIG. 3 illustrates a robotic transfer assembly in accordance with one or more embodiments of the present technology.

FIG. 3 illustrates the transfer unit 104 in accordance with one or more embodiments of the present technology. The transfer unit 104 can include an imaging system 160 and a robotic arm system 132. The imaging system 160 can provide image data captured from a target environment with a de-palletizing platform 110 and/or the target location. The robotic arm system 132 can include a robotic arm assembly 139 and an end effector 140 (e.g., a gripper assembly). The robotic arm assembly 139 can position the end effector 140 above a group of objects in a stack 165 located at a pickup environment or region 163.

FIG. 3 shows the end effector 140 carrying a single target object (e.g., the target object 112) positioned above a conveyer 120 (e.g., conveyer belt). The end effector 140 can release the target object 112 onto the conveyor 120, and the robotic arm system 132 can then retrieve packages 112a, 112b by positioning the unloaded end effector 140 directly above package 112a, package 112b, or both. The end effector 140 can then hold, via a vacuum grip, one or more of packages 112a, 112b, and the robotic arm system 132 can carry the retained packages 112a and/or 112b to a position directly above the conveyor 120. The end effector 140 can then release (e.g., simultaneously or sequentially) the packages 112a, 112b onto the conveyor 120. This process can be repeated any number of times to carry the objects from the stack 165 to the conveyor 120.

With continued reference to FIG. 3, the de-palletizing platform 110 can include any platform, surface, and/or structure upon which a plurality of target objects 112 (singularly, "object 112") may be stacked and/or staged when ready to be transported. The imaging system 160 can include one or more imaging devices 161 configured to capture image data (e.g., 2D and/or 3D depictions) of the packages 112a, 112b on the de-palletizing platform 110 and/or the conveyor 120. The imaging devices 161 can capture distance data, position data, video, still images, lidar data, radar data, and/or motion at the pickup environment or region 163. In some embodiments, the imaging devices 161 may be placed facing downward over the corresponding locations, such as to provide top-view depictions of the locations and the objects therein. Additionally or alternatively, the imaging devices 161 may be placed laterally offset from and at least partially facing along a lateral direction toward the corresponding locations, such as to provide side-view and/or perspective depictions.

It should be noted that, although the terms "object" and "package" are used herein, the terms include any other items capable of being gripped, lifted, transported, and delivered such as, but not limited to, "case," "box," "carton," or any combination thereof. Moreover, although polygonal boxes (e.g., rectangular boxes) are illustrated in the drawings disclosed herein, the shapes of the boxes are not limited to such shape but include any regular or irregular shape that, as discussed in detail below, is capable of being gripped, lifted, transported, and delivered.

Like the de-palletizing platform 110, the conveyor 120 can include any platform, surface, and/or structure designated to receive the packages 112a, 112b for further tasks/operations. In some embodiments, the conveyor 120 can include a conveyor system for transporting the object 112 from one location (e.g., a release point) to another location for further operations (e.g., sorting and/or storage). In some embodiments, the robotic system 100 can include a second imaging system (not shown) configured to provide image data captured from a target environment with a target placement location (e.g., the conveyor 120). The second imaging system can capture image data of the packages 112a, 112b on the receiving/placement location (e.g., the conveyor 120).

Example Task Implementation Processes

Figure 4A:
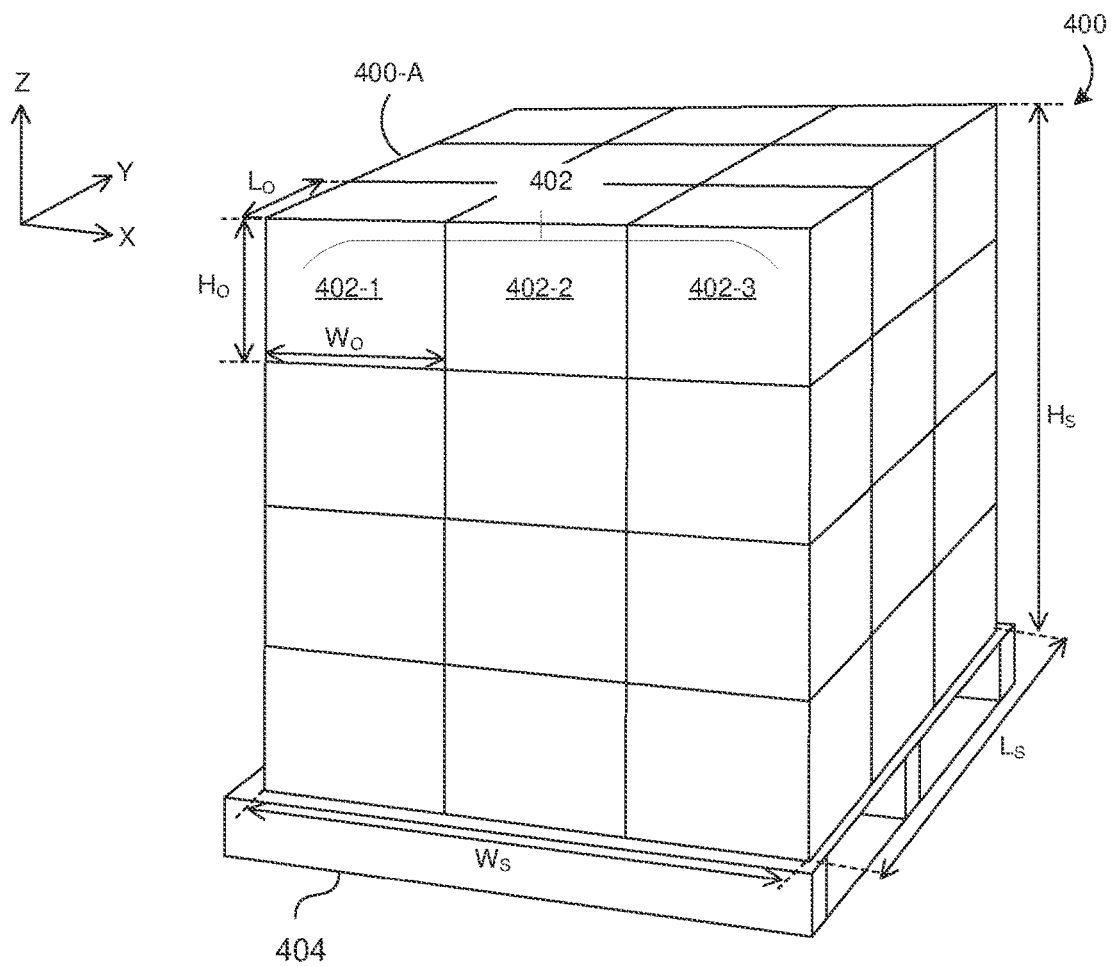
FIG. 4A illustrates an example stack in accordance with one or more embodiments of the present technology.
Figure 4B:
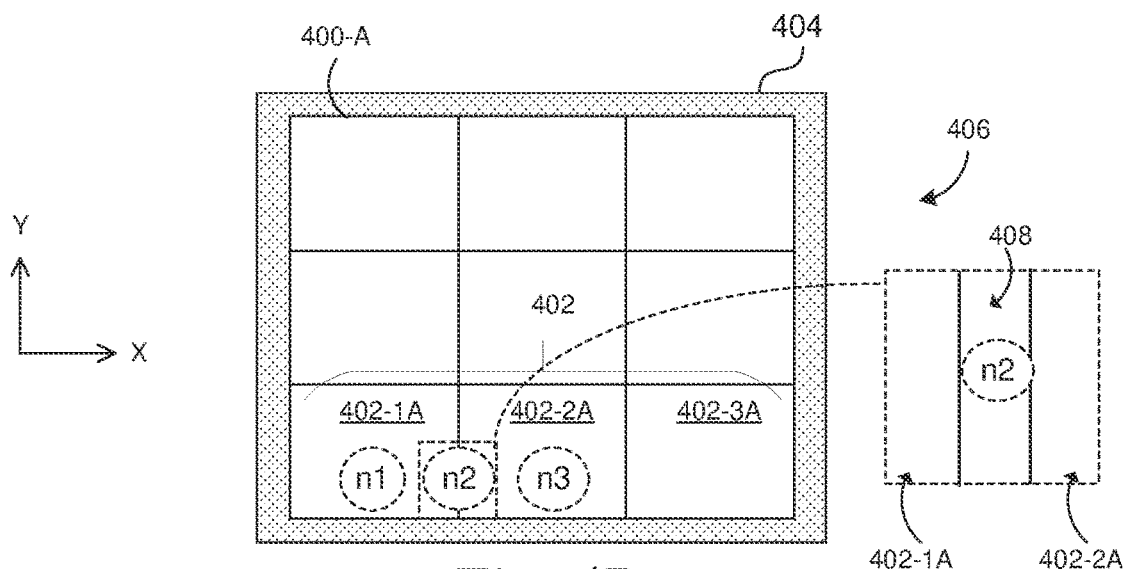
FIG. 4B illustrates an example image data depicting the stack in accordance with one or more embodiments of the present technology.

FIG. 4A illustrates an example stack 400 in accordance with one or more embodiments of the present technology. FIG. 4B illustrates an example image data 406 depicting the stack 400 in accordance with one or more embodiments of the present technology. Referring now to FIG. 4A and FIG. 4B together, the image data 406 can represent a top view of the stack 400 at the start location (e.g., the de-palletizing platform 110 of FIG. 3). The image data 406 can include 2D and/or 3D data from the imaging system 160 of FIG. 3.

As shown in FIG. 4A, the stack 400 (e.g., an object stack) includes objects 402 including objects (e.g., objects 402-1, 402-2, and 402-3) arranged in an organized pile. The stack 400 illustrated in FIG. 4A may correspond to an object stack positioned at a start location (e.g., the start location 114 in FIG. 1) before a transfer of any of the objects 402 in the object stack 400 to a task location (e.g., the task location 116 in FIG. 1). The image data 406 thereby represents a top view of the stack 400 at the start location prior to picking any of the objects from the stack 400 (e.g., the image data 406 may be referred to as preceding image data). The objects 402 may be arranged so that a total volume of the stack 400 is minimized. In FIG. 4A, the objects 402 are arranged so that the object stack 400 has a co-planar, or substantially co-planar, top surface 400-A. The co-planar top surface 400-A is composed of co-planar or substantially co-planar top surfaces 402-1A, 402-2A, and 402-3A of the objects 402-1, 402-2, and 402-3, respectively, that are arranged adjacent to each other. As used herein, a total volume of the object stack corresponds to a volume defined by outer edges of the object stack. In FIG. 4A, the object stack 400 has dimensions corresponding to a stack height ($H_S$), stack width ($H_S$), and stack length ($L_S$), and a volume ($V_S$) of the object stack 400 corresponds to $V_S = H_S \times H_S \times L_S$. It is noted that the volume of the object stack is defined based on the outermost edges and surfaces and does not take into account any spacings or gaps within the stack. For example, the objects in the object stack 400 may be positioned separate from each other (e.g., with spacing between the object 402-1 and the object 402-2). A volume of an individual object (e.g., the object 402-1) in the object stack 400 has dimensions corresponding to an object height ($H_O$), object width ($H_O$), and object length ($L_O$), and a volume ($V_O$) of the object corresponds to $V_O = H_O \times H_O \times L_O$. In some embodiments, the object stack 400 is positioned on a placement platform (e.g., a pallet).

In some embodiments, the image data 406 in FIG. 4B can include a depth map and/or a point cloud that represents a distance between the imaging system 160 and detected surfaces/points of the objects 402 within a field of view of the imaging system 160. For example, as described above, the imaging devices 222 can generate a representation of the environment detected in an image that corresponds to a depth map and/or a point cloud. The depth map can include depth measures (e.g., along a Z-direction) at discrete points along a lateral plane (e.g., at locations '$n_1$,' '$n_2$,' and '$n_3$' on an X-Y plane illustrated in FIG. 4B). For the example illustrated in FIG. 4B, the image data 406 can depict the co-planar top surfaces (e.g., matching depth measures) of nine objects 402 that form the top surface of the stack 400 (e.g., the co-planar or substantially co-planar top surfaces 402-1A, 402-2A, and 402-3A of the objects 402-1, 402-2, and 402-3, respectively). The matching depth can correspond a stack height ($H_S$ in FIG. 4A). The image data 406 may also depict depth measures for a top surface of a placement platform 404 (e.g., the pallet shown with dotted fill). The stack height $H_S$ can correspond to a vertical distance between a corresponding top surface (e.g., the surface 400-A) of the object/stack and the top surface of the placement platform (e.g., a top surface of the placement platform 404).

In some embodiments, the depth map and/or the point cloud can be used for identifying a gap between two adjacent objects (e.g., a gap 408 between the objects 402-1A and 402-2A in the inset of FIG. 4B). Identifying the gap may include determining depth measures at discrete locations along the surface 400-A of the stack 400 (e.g., locations '$n_1$,' '$n_2$,' and '$n_3$' along the surface 400-A of the stack 400 in FIG. 4B). In FIG. 4B, the location '$n_1$' is positioned on the surface 402-1A, the location '$n_3$' is positioned on the surface 402-2A, and the location '$n_2$' is positioned between the surfaces 402-1A and 402-2A. In an instance where the depth measure at location '$n_2$' is greater (e.g., lower surface height) than the depth measures at the locations '$n_1$' and '$n_3$,' the robotic system 100 can determine that the location '$n_2$' corresponds to a gap (e.g., the gap 408) between the adjacent objects 402-1A and 402-2A in FIG. 4B. For example, the robotic system 100 can compare edges surrounding or defining the gap to a shape template and/or a set of dimension thresholds stored in the master data. Also, the robotic system 100 can compare the differences in the depth measures between locations '$n_1$' and '$n_2$' and/or '$n_2$.' The robotic system 100 can determine the area bounded between the edges as the gap when the shape of the edges fail to match known/expected objects represented in the shape template, when one or more of the dimensions fail to satisfy the set of dimension thresholds (e.g., gaps having a width less than the minimum dimension/width), and/or when the height differences are greater than a minimum difference threshold.

The robotic system 100 can use the image data 406 to detect the objects 402 in the stack 400. The object detection can include estimating an identity and/or a location of an object depicted in the image data 406. In some embodiments, the robotic system 100 can process the image data 406 (e.g., the 2D and/or the 3D depictions) to identify corners and/or edges/lines depicted therein. Such identifying may include identifying corners and edges of the stack 400 and/or identifying corners and edges of the objects 402 in the stack 400. The robotic system 100 can process the corners and/or the edges to estimate surface or peripheral boundaries for each of the depicted objects. The robotic system 100 can use the estimated boundaries to estimate the bounded surfaces (e.g., top surfaces) of each of the depicted objects. For example, the robotic system can estimate peripheral boundaries of surfaces 402-1A, 402-2A, and 402-3A of objects 402-1, 402-2 and 402-3, respectively, of boundaries of co-planar surface 400-A of stack 400. For example, the identification may include analyzing the image data 406 corresponding to a 2D visual image of the stack 400 based on image detection methods including, e.g., algorithms trained to identify corners of boxes and packages. Furthermore, such image detection methods may be trained to distinguish the corners and edges of the object from visual features on the object. For example, the robotic system is trained to distinguish flaps, tape, or other visual features on the surface of the object from an actual edge of the object.

In some embodiments, the robotic system 100 identifies the depicted objects based on comparing the 2D image patterns of the estimated surfaces and/or the surface edge dimensions to known or registered objects in the master data. For example, in FIG. 4B the objects 402 are arranged in a three-by-three array. When the comparison yields a match (e.g., as defined by a set of thresholds, such as for overlaps, confidence measures, or the like), the robotic system 100 can detect that the identified object is located at a location defined by the determined edges. In some embodiments, the robotic system 100 identifies the depicted objects based on comparing the 3D image patterns of the estimated surfaces and/or the surface edge dimensions.

The robotic system 100 can process unrecognized/unmatched portions of the image data as corresponding to one or more unrecognized or unexpected objects or as corresponding to one or more gaps. For example, an unrecognized portion of the image data 406 may correspond to an irregularly shaped object or a damaged object. The robotic system 100 can automatically or autonomously register the unexpected object during manipulation or task implementation. In some embodiments, the robotic system 100 can derive a minimum-viable region (MVR) for gripping the unexpected object. The robotic system 100 may use the MVR to grasp and lift and/or transfer the object from the start location to the task location. The robotic system 100 can detect the actual edges, the corresponding dimensions (e.g., lateral dimensions), and/or the visual surface image (e.g., the corresponding portion of the image data) of the unrecognized object based on the movement thereof. The robotic system 100 can compare images taken before and after removal/movement of the unrecognized object to derive the dimensions (e.g., the lateral dimensions and/or the height) thereof. The robotic system 100 can further determine the height of the object during transfer based on measuring or observing the object during transfer, such as using crossing/line sensors and/or side-view cameras. The robotic system 100 can obtain other measurements or estimates, such as the weight, the CoM location, or the like, during the transfer of the object.

The robotic system 100 can use additional information that describes the content of the stack, such as shipping manifest, order receipt, task tracker (e.g., corresponding to a history of removed/transferred objects), or the like to process the objects (e.g., recognized and/or unrecognized objects). For example, the robotic system 100 can determine a preliminary list of expected objects based on the content description of the stack. During object detection, the robotic system 100 can compare the image data to registered descriptions of the objects on the preliminary list before other objects.

The robotic system 100 can use the object detection, the results from processing the image data, the master data, the stack description, and/or additional descriptive data to extrapolate additional information regarding the stack, the objects therein, and/or the status of task implementations. For example, the robotic system 100 can estimate the number of objects within the stack and/or the arrangement of the objects within the stack.

Example Dimension (Height) Estimation

In some embodiments, the robotic system 100 can use the obtained data to derive and/or confirm the dimensions of the transferred objects. To process the dimensions, the robotic system 100 may obtain and use a set or a sequence of image data obtained at different times (e.g., before and/or after a set of picks/placements). For example, the robotic system 100 can use images captured for object detections and/or other images (e.g., separate images captured for verification or other purposes) to derive the height of objects that have been transferred between the images.

For context, the robotic system 100 may derive a transfer sequence and/or a packing configuration (e.g., a set of placement locations for each object targeted to be placed at the task location) along with motion plans for the targeted objects. Each motion plan can include a set of commands and/or settings used to operate a robotic unit (e.g., the transfer unit 104 of FIG. 1, the robotic arm system 132 of FIG. 1, etc.) to transfer a corresponding set of objects from a start location to a task location. Accordingly, the beginning portion of the motion plan can correspond to a picking action and/or the ending portion of the motion plan can correspond to a placement action. The robotic system 100 (via, e.g., a planning device/module separate from the controller or included in the controller) can derive the motion plan such that the placement action follows the packing configuration. Furthermore, the motion plans can be sequenced according to the transfer sequence.

The robotic system 100 (via, e.g., the controller) can track the implementation of the motion plans using a transfer history (e.g., a pick history and/or a placement history) that follows the transfer sequence. The transfer history can represent which object was picked from or placed at which location across time. For example, the transfer history can include object detection information (e.g., an object identifier and/or an estimated start location of the object), an estimated size or dimension (e.g., lateral dimensions) of the object, a plan identifier representative of the motion plan used to transfer the object, one or more time stamps associated with the transfer or implementation of the motion plan, estimated or planned placement location/pose of the object, or the like.

The robotic system 100 (e.g., using a module/process separate from one implementing the transfers) can obtain and process additional image data during and/or after implementation of the motion plans. The robotic system 100 can compare the tracked history to the image data to further derive or validate the dimensions of the objects that were transferred between the times of the images. In other words, the robotic system 100 can use the tracked history to determine lateral coordinates of the removed objects as depicted in the obtained images.

Figure 5A:
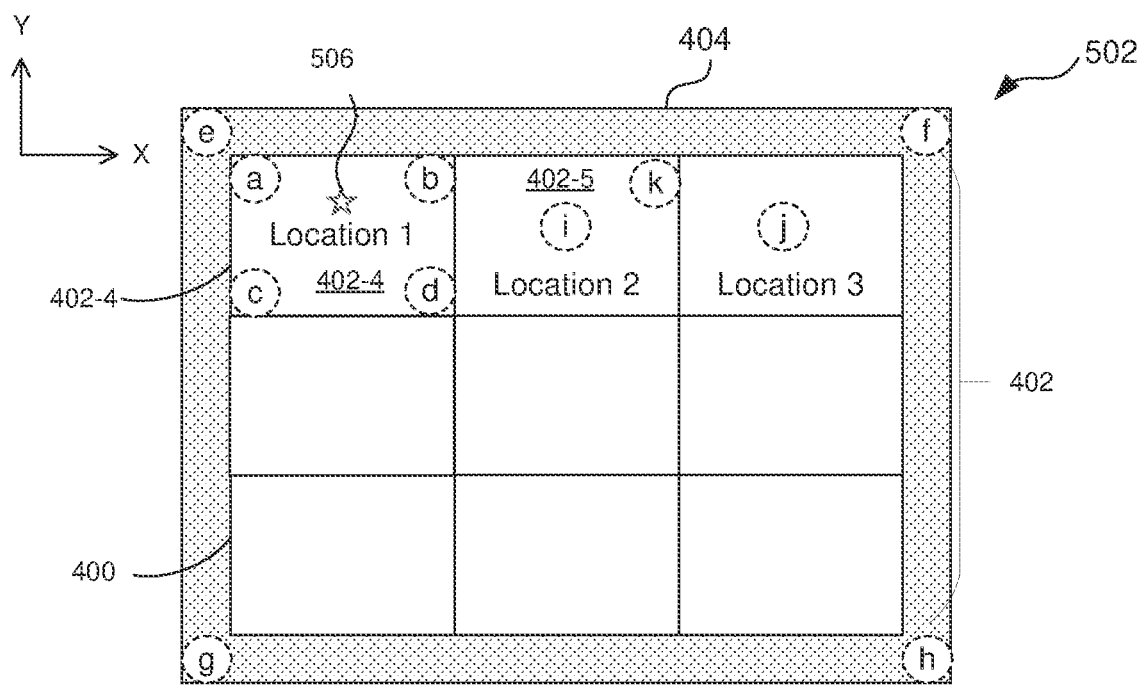
FIG. 5A illustrates a first image of a start location in accordance with one or more embodiments of the present technology.
Figure 5B:
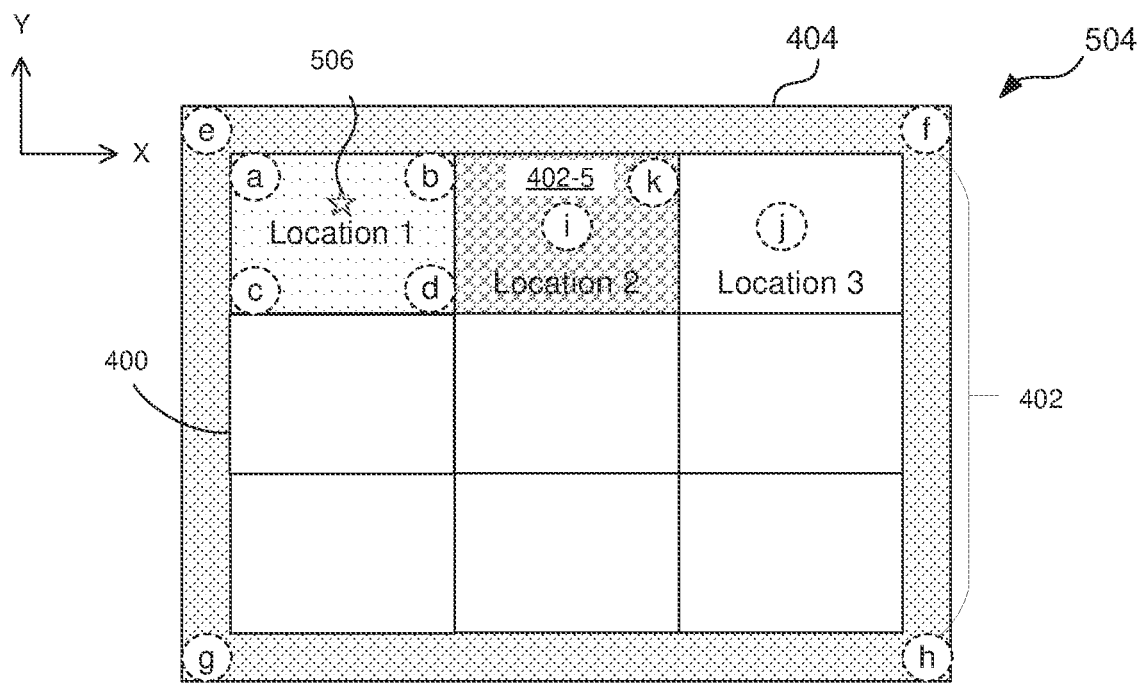
FIG. 5B illustrates a second image of the start location in accordance with one or more embodiments of the present technology.

For an illustrative example of the derivation, FIG. 5A illustrates a first image 502 (e.g., preceding image data) of a start location, and FIG. 5B illustrates a second image 504 (e.g., subsequent image data) of the start location, both in accordance with one or more embodiments of the present technology. The first image 502 and the second image 504 depict a top-view image of stack 400 including objects 402, as described with respect to FIGS. 4A-4B. The first image 502 can depict the corresponding start/task location before picking one or more objects, and the second image 504 can depict the location after picking one or more objects. In some embodiments, the first and second images can be sequential and represent two back-to-back images taken during the task implementation process. As shown, in FIG. 5A the stack 400 includes objects 402 at object locations 1, 2, and 3. In FIG. 5B objects from the object locations 1 and 2 have been removed (e.g., objects 402-4 and 402-5 have been removed, as illustrated with patterns fills) while object location 3 still has an object (illustrated as a white fill).

The robotic system 100 can compare the depth measures (illustrated using different fills in FIG. 5B) at and/or around picked objects to validate the object picking to derive one or more dimensions of the transferred objects. As shown, the first image 502 in FIG. 5A depicts an object 402-4 in location 1 which is subsequently removed and is not depicted in FIG. 5B. For example, the robotic system 100 can identify one or more comparison locations along a lateral plane (e.g., locations along the x and y plane, such as locations 'a'-'d' for the plane corresponding to object location 1) that correspond to the initial detection of the transferred object 402-4. In some embodiments, the identified/compared locations can correspond to one or more corners, one or more edges, and/or a center portion (e.g., an area offset from the outer edges/corners by a predetermined lateral distance or by a percentage of the estimated edge length) of the detected object. The robotic system 100 may further identify locations corresponding to detected objects (e.g., abutting corners or edges) adjacent to the transferred objects for comparison purposes.

The robotic system 100 can use the comparison locations to compare the depth measures in the before and after removal images, such as the first image 502 and the second image 504, to derive the height of the removed object (e.g., height $H_O$ shown in FIG. 4A). However, since characteristics of a layer underneath the removed objects may be unknown, the robotic system 100 can implement additional processes to derive the height of the removed object. For example, the supporting layer under the removed object may not be uniform in height. As a result, the removed object may have been supported by a few contact points (e.g., three or more). Also, one or more predetermined comparison locations may overlap a non-supported location or a gap. Including unvalidated or unprocessed depth measures in such conditions can lead to erroneous height derivations.

As such, for comparison purposes, the robotic system 100 can qualify or validate one or more depth measures at the comparison locations. For example, the robotic system 100 can identify outliers in the depth measures based on comparing the depth measures at the comparison points to each other. The robotic system 100 can identify and remove from consideration any outlier depth measures that differ from the others in the set by a predetermined amount or percentage. The depth comparisons and the outlier considerations can account for situations in which the outlier comparison point overlaps a gap in the supporting layer. Accordingly, the robotic system 100 can remove errors resulting from analyzing gaps underneath the removed object.

In some embodiments, the robotic system 100 can derive the height of the transferred object based on averaging the depth measures at multiple comparison locations (e.g., comparison locations 'a'-'d', 'i', or the like), such as estimated corners and/or center portions. In particular, when the depth measures at the multiple locations are within a predefined threshold the height of the transferred object can be derived based on averaging the depth measures thereby expediting the process for determining the height. The predefined threshold may correspond to a typical measurement error of the depth measurements or be arbitrarily set by an operator of the robotic system. For example, the operator of the robotic system 100 may set the threshold value to a certain percentage (e.g., 2%, 5% or 10%) of a typical height of transferred objects.

Additionally or alternatively, the robotic system 100 can further derive the height based on an estimated CoM location (e.g., CoM location 506 in FIGS. 5A-5B), such as by comparing the depth measures at the CoM locations across the before and after images. The robotic system 100 can access the CoM location from the master data when the transferred object was matched with a corresponding registered object during object detection. When the transferred object is an unrecognized object, the robotic system 100 can estimate the CoM (e.g., lateral coordinates and/or depth within that corresponds to a balancing point) of the object during transfer (e.g., after lifting the object) based on measurements (e.g., weight and/or torque vector measurements) from force/torque sensors on the end effector. The estimated CoM may be stored for registering the unrecognized object.

Additionally or alternatively, the robotic system 100 can dynamically identify and use support locations from the second image 504 which is obtained after the removal of the object 402-4 in FIG. 5B to derive the object height, such as when the supporting object has an irregular/non-planar surface. For example, the robotic system 100 can analyze the depth measures for the area exposed after removing the object to determine a set of highest points on the previously covered surface (e.g., a top surface of the object beneath the transferred object). For example, in FIG. 5B an area illustrated with a dotted pattern is exposed after moving the object 402-4 from location 1 shown in FIG. 5A. The robotic system 100 can identify a set of lateral locations that correspond to the highest heights relative to the CoM, such as within a threshold distance from and/or locations opposite the CoM along one or more directions/axes. The robotic system 100 can determine the corresponding locations as support/contact points. The robotic system 100 can calculate the height based on comparing the depth measures at the contact points across the before and after images.

The robotic system 100 can prioritize depth measures at the CoM, the center portion, and/or the support locations over measures at other locations. For example, the robotic system 100 can prioritize by ignoring the depth measures at other locations, providing higher weights to the measures at prioritized locations, or a combination thereof. Accordingly, the robotic system 100 can provide improved accuracy for the height of the removed object at rest by analyzing the heights at the supported locations. In other words, the robotic system 100 can provide increased accuracy in the derived height by processing most-likely-supported locations based on the CoM and the center portion. Moreover, the robotic system 100 can use the CoM, the center portion, and/or the support locations to derive heights for objects within a stack having mixed object types (e.g., a mixed stock-keeping-unit (SKU) stack including a plurality of objects having different shapes and sizes).

In some embodiments, the robotic system 100 derives the height of the transferred object by deriving a first height from a first comparison location (e.g., comparison location 'a' at the location 1 in FIG. 5B that was originally occupied by the object 402-4 in FIG. 5A) and a second height distinct from a second comparison location (e.g., comparison location 'b' at the location 1 in FIG. 5B that was originally occupied by the object 402-4 in FIG. 5A). The robotic system may then calculate a difference between the first height and the second height. In an instance where the difference between the first height and the second height is below a predetermined threshold height difference (e.g., a nominal threshold height difference corresponding to a measurement error), the robotic system determines the height of the transferred object 402-4 by averaging the first height and the second height and comparing the average to the heights measured from FIG. 4A, prior to transferring the object 402-4. For example, when the difference between the heights measured at the comparison locations 'a' and 'b' is below a nominal threshold corresponding to a measurement error of the depth measurements, then the robotic system 100 determines that the locations 'a' and 'b' in FIG. 5B correspond to a co-planar surface. In such an instance, the robotic system determines the height of the transferred object based on the average of the heights measured at the comparison locations 'a' and 'b' in FIG. 5B. In an instance where the difference between the first height and the second height is above the predetermined threshold height difference, the robotic system 100 assigns the lower of the first height and the second height to be used for calculating the height of the transferred object. For example, when the difference between the heights measured at the comparison locations 'a' and 'b' is greater than the nominal threshold, then the robotic system 100 determines that the locations 'a' and 'b' in FIG. 5B do not correspond to a co-planar surface. Such an instance may correspond, for example, to an instance where the object 402-4 has been placed on top of two different objects having different heights (e.g., the location 'a' in FIG. 5B corresponds to an object having a greater height and the location 'b' corresponds to an object having a lower height). In such an instance, the robotic system determines the height of the transferred object based on the lower one of the heights measured at the comparison locations 'a' and 'b' in FIG. 5B (e.g., the object 402-4 has been supported by the object having a greater height).

In some embodiments, the robotic system 100 may further process the calculated differences in the depth measure relative to the shape primitives. For example, the robotic system 100 can compare the lateral dimensions and the differences in the depth measure(s) for the removed object to lateral dimensions of one or more shape primitives (e.g., expected object shapes and sizes). Using the comparison results, the robotic system 100 can map the various dimensions/measures to previously identified objects corresponding to unique primitives, predetermined object poses (such as by, e.g., identifying each value as one of length, width, and height of the object), or the like.

In some embodiments, the robotic system 100 verifies safe removal of the object before deriving the height or before validating the derived height. The robotic system 100 may verify safe removal based on analyzing a shape of the objects (e.g., the exposed surfaces, such as the top surfaces, of the objects) remaining at the start location (e.g., the shape of the object at location 1 in FIG. 5A that is exposed after removal of the top-most object 402-4 shown in location 1 in FIG. 5A) and/or located at the task location. For example, the robotic system 100 can calculate one or more slope values along or between the exposed surfaces, such as using the previously identified comparison locations. For example, the robotic system 100 can calculate a slope value between two of the comparison locations 'a'-'b' in FIG. 5B. The robotic system 100 can verify safe removal when the calculated slopes are within predetermined thresholds that represent lateral/horizontal surfaces and/or other expected surface orientations corresponding to stacking rules and/or object shape primitives. The predetermined threshold corresponds to, for example, a typical measurement error of the depth measurements. For example, a calculated slope within a predetermined threshold is an indication that the slope is approximately zero corresponding to a planar surface at location 1 in FIG. 5B. When the calculated slopes are within the threshold and/or the calculated slopes are planar (e.g., slopes on opposing sides of the center portion), the robotic system 100 may estimate that the corresponding object (e.g., the object under the transferred object remaining at the start location and/or the transferred object at the task location) is undamaged (e.g., is not crushed and maintains its original shape). When the calculated slopes are outside of the thresholds, and/or when the calculated slopes are not planar, the robotic system 100 may estimate that the corresponding object may have been crushed or damaged during the transfer. The robotic system 100 can bypass the height derivation or validation thereof in response to estimating the crushed object(s).

The robotic system 100 can similarly verify or determine the status of other transfer conditions. For example, the robotic system 100 can use the determined depth measures to determine unintended multi-picks, where one or more unintended objects were transferred with or moved during the transfer of the targeted object. For example, the robotic arm grasps two objects at the start location instead of grasping just a single object as is intended based on the transfer plan. The robotic system 100 can determine the unintended multi-picks when depth measures outside of the detected/targeted objects (as indicated by the pick history) differ across the before and after pick/placement images.

For illustrative purposes, the object height calculation is described with respect to top-view images at the start locations. However, it is understood that the robotic system 100 can derive the heights differently. For example, the robotic system 100 can similarly derive the height of the newly placed object using before and after placement images at the task location. Also, the robotic system 100 can similarly use side view and/or perspective images to determine one or more dimensions.

Operational Flow

Figure 6:
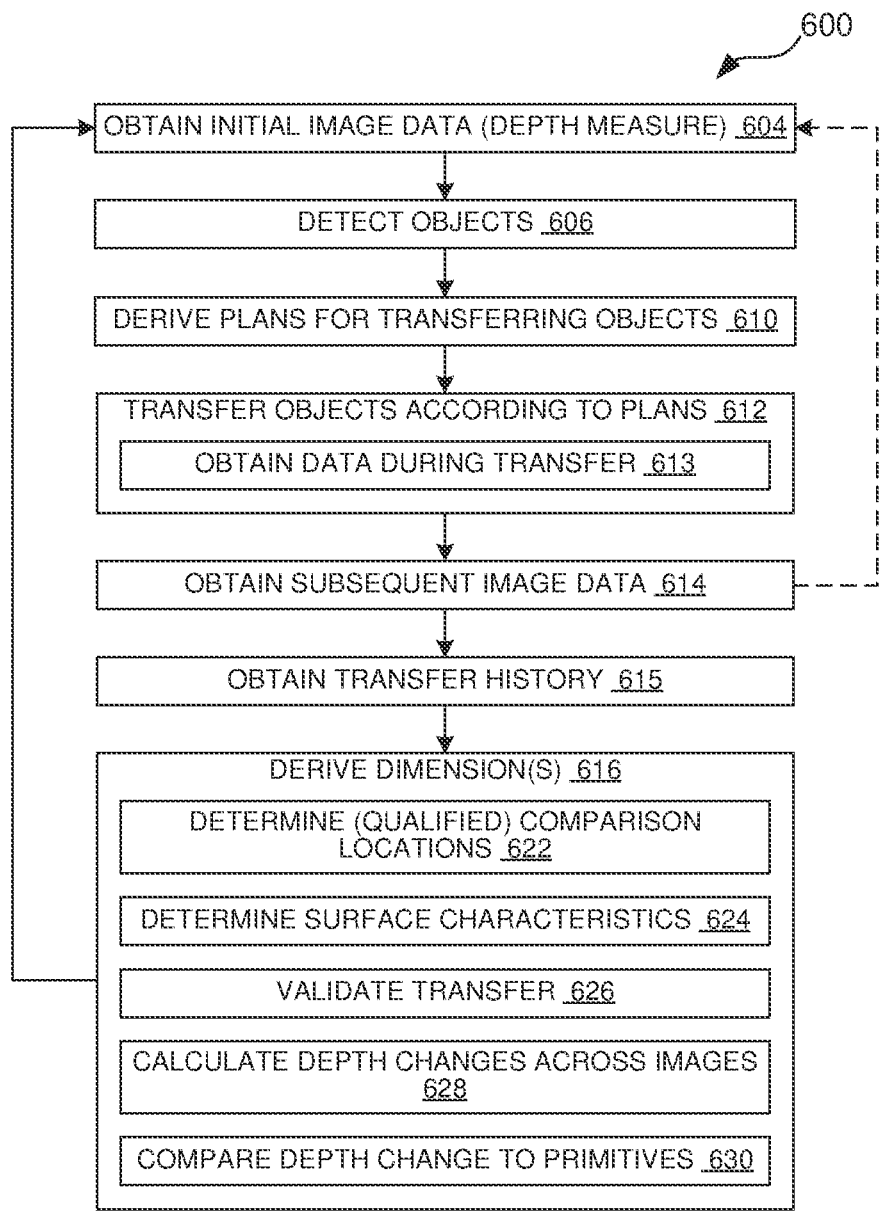
FIG. 6 is a flow diagram for operating a robotic system in accordance with one or more embodiments of the present technology.

FIG. 6 is a flow diagram of an example method 600 for operating a robotic system in accordance with one or more embodiments of the present technology. The method 600 can be for deriving estimations (e.g., object dimensions) based on one or more measurements (e.g., depth measures) captured during task execution. The method 600 can be implemented based on executing the instructions stored on one or more of the storage devices 204 of FIG. 2 with one or more of the processors 202 of FIG. 2. In implementing the motion plan and/or the method 600, the processors 202 can send the motion plan or an associated set/sequence of commands/settings to the robotic unit(s) (e.g., transfer assembly or transfer unit 104 of FIG. 1 and/or the end effector 140 of FIG. 3). Accordingly, the transfer unit 104 and/or the end effector 140 can execute the motion plan to grasp and transfer the packages.

At block 604, the robotic system 100 can obtain initial image data depicting the start location and/or the target location (e.g., the first image 502). The robotic system 100 can use the imaging systems, sensors, and/or cameras (e.g., the imaging devices 222 and/or the position sensors 224 described with respect to FIG. 2). The obtained image data can include 2D images and/or 3D images (e.g., depth maps) depicting the object stack (e.g., the stack 400 in FIG. 4A) and/or the corresponding platforms (e.g., bins, pallets, conveyor, etc., such as the placement platform 404).

At block 606, the robotic system 100 can process the obtained 2D or 3D images to detect the depicted objects. The robotic system 100 can process the obtained images (e.g., image data 406 in FIG. 4B) to detect edges and corners of the objects in the object stack (e.g., object stack 400 including objects 402). The robotic system may further identify lateral surfaces using the detected edges and corners of the objects. The robotic system 100 can detect the edges, identify surfaces, and/or compare the images of the surfaces to the master data to detect the objects.

At block 610, the robotic system 100 can derive plans (e.g., motion plans, transfer sequence, packing plan, etc.) for the objects in the stack. The robotic system 100 can derive the plans based on a predetermined process, such as by deriving placement locations for each object that satisfies a set of predetermined rules, deriving a sequence of object transfers to achieve the packing plan, and/or deriving the motion plans from iterating potential locations from the placement locations/poses to the start location.

At block 612, the robotic system 100 can transfer the objects in the stack, such as by implementing the motion plan (via, e.g., the controller) according to the planned sequence. The robotic system 100 can implement the motion plans to operate the robotic arm and/or the end effector to grasp the target object, lift and transfer the grasped object, and release the object at the planned location. At block 613, the robotic system 100 can obtain additional data during the transfer of the object. For example, the robotic system 100 can obtain lateral dimensions of the object based on implementing an initial displacement to separate the edges of the grasped object from adjacent objects. Also, the robotic system 100 can obtain weight and/or torque vectors resulting from lifting the grasped object. The robotic system 100 can use the weight, the torque vectors, the grip location, and/or estimated dimensions of the object to estimate the CoM.

At block 614, the robotic system 100 can obtain subsequent image data during object transfer (e.g., implementation of motion plans). Accordingly, the robotic system 100 can obtain images (e.g., 2D images and/or 3D depth maps) before (block 604) and after (block 614) transferring one or more subsets of objects. The robotic system 100 can obtain depictions of the start locations and the remaining objects and/or depictions of the target locations and the newly placed objects. For example, the second image 504 in FIG. 5B includes the subsequent image depicting the start location after at least one object 402 from the stack 400 has been removed.

At block 615, the robotic system 100 can obtain transfer history that describes the objects transferred between two sequential images. To identify the transferred objects, the robotic system 100 can determine the times (e.g., time stamps) associated with the initial image data (block 604) and the subsequent image data (block 614). The robotic system 100 can access the storage devices 204 and identify the corresponding times in the transfer history. The robotic system 100 can identify the objects transferred between the identified times in the transfer history as the objects transferred between the images. The robotic system 100 can further access the detection information for the transferred objects to determine the object location(s) (e.g., a center portion, edges, corners, etc.) and/or other aspects (e.g., estimated lateral dimensions, known CoM, etc.) associated with the transferred objects.

At block 616, the robotic system 100 can derive one or more dimensions (e.g., object heights) of the transferred objects based on comparing the obtained image data with the preceding/initial image data. At block 622, the robotic system 100 can determine and/or qualify comparison locations (e.g., points along a lateral plane) as described above. The number of comparison locations may be two, three, four, or five per object. For example, in FIGS. 5A-5B the robotic system 100 has identified comparison locations 'a'-'d' near corners of the object 402-4 that is occupying the location 1 in FIG. 5A. The robotic system 100 may determine the height of the object 402-4 by extracting the depth measures at the comparison locations 'a'-'d' in the first image 502 in FIG. 5A from the depth measures at the comparison locations 'a'-'d' in the second image 504 in FIG. 5B. In some embodiments, the system 100 determines the height of the object only based on the comparison locations without processing heights at other locations initially occupied by the removed object to expedite the processing. The height determination at block 616 can be done parallel or separate from deriving the motion plan and transferring objects in accordance with the motion plan described with respect to Blocks 610 and 612.

In some embodiments, the deriving the one or more dimensions of the transferred objects includes identifying a gap between two adjacent objects (e.g., a gap 408 between the objects 402-1A and 402-2A in the inset of FIG. 4B). Identifying the gap may include determining depth measures at discrete locations along the surface (e.g., locations '$n_1$,' '$n_2$,' and '$n_3$' along the surface 400-A of the stack 400 in FIG. 4B). For example, in FIG. 4B, the location '$n_1$' is positioned on the surface 402-1A, the location '$n_3$' is positioned on the surface 402-2A, and the location '$n_2$' is positioned between the surfaces 402-1A and 402-2A. In an instance where the depth measure at location '$n_2$' is greater (e.g., lower surface height) than the depth measures at the locations '$n_1$' and '$n_3$,' the robotic system 100 can determine that the location '$n_2$' corresponds to a gap (e.g., the gap 408) between the adjacent objects 402-1A and 402-2A in FIG. 4B. For example, the robotic system 100 can compare edges surrounding or defining the gap to a shape template and/or a set of dimension thresholds stored in the master data to derive the one or more dimensions. In instances where an object stack is a single stock-keeping unit (SKU) (e.g., an SKU including a plurality of objects having a same shape and size), the robotic system 100 can determine the one or more dimensions of the transferred object based on the identified gaps. For example, the robotic system 100 determines that a single SKU object stack includes a certain number of objects based on the identified gaps between the objects without further processing (e.g., analyses of non-planar surfaces).

At block 624, the robotic system 100 can determine surface characteristics for image regions associated with the transferred objects. The surface characteristics may include dimensions of the surface (e.g., length $L_O$ and width $W_O$ in FIG. 4A), a shape of the surface, and/or a slope of the surface. For example, the robotic system 100 can calculate slopes between one or more of the comparison locations and use the slopes to determine whether the exposed surfaces of the transferred object, the surrounding object, and/or the object previously under the transferred object have planar or otherwise expected surface characteristics. The robotic system 100 may use this determination to validate that the surrounding object or the object previously under the transferred object has not been damaged during the removal of the transferred object.

Furthermore, in an instance where the exposed surfaces of the transferred object, the surrounding object, and/or the object previously under the transferred object do not have planar or otherwise expected surface characteristics, the robotic system 100 determines that the respective object has been damaged during a pick of the transferred object. For example, FIG. 5A illustrates the first image 502 including a top-view image of the object stack 400 before any of the objects 402 have been removed. FIG. 5A illustrates the second image including a top view of the object stack 400 after the object 402-4 has been removed from location 1. The comparison locations 'a'-'d' can be used to determine a slope of the surface exposed underneath the object 402-4 removed from location 1 (e.g., illustrated with the dotted fill in FIG. 5B) to determine whether the surface underneath the transferred object has been damaged.

As a part of determining the dimensions, the robotic system 100 can validate the transfer as illustrated at block 626. In some embodiments, the robotic system 100 can validate the transfer of the object(s) when the slopes and/or depth differences across the images match a set of threshold conditions/values (e.g., that the transfer was successful). For example, the robotic system 100 can validate the transfer when the transferred object, the surrounding object, and/or the previously supporting object are determined to not have been crushed during the transfer as described above.

To derive the dimensions following validated transfers, the robotic system 100 can calculate the depth changes across the images as illustrated at block 628. The robotic system 100 can calculate the differences at the comparison locations that correspond to the transferred objects (e.g., as indicated by the transfer history). In some embodiments, the robotic system 100 can calculate an average of the depth measures and/or prioritize certain locations (e.g., the CoM, the estimated support/contact locations, the center portion, etc.) as described above.

For example, in order to be stable on a non-planar surface, an object needs to be supported by at least three surface locations surrounding a CoM of the object. The robotic system 100 can thereby calculate the height of a transferred object by identifying three (or more) support locations surrounding the CoM along a non-planar surface where the transferred object was positioned before being transferred. The three support locations are identified based on depth measurements so that the three support locations correspond to the three locations having the shortest depth measures among all depth measures obtained along the surface. The height of the transferred object can be derived by averaging the depth measures at the three support locations.

At block 630, the robotic system 100 can compare the calculated depth changes to object primitives (e.g., primitives corresponding to expected object shapes and sizes). The robotic system 100 can map the depth changes to a dimension or a direction for the transferred object according to the comparison. Thus, the robotic system 100 can map the depth change and the lateral dimensions of the transferred object to the length, width, and height of the object.

In some embodiments, the steps of the method 600 (e.g., one or more of the steps 604 through 630) can be repeated iteratively as illustrated using a solid feedback arrow to, for example, derive dimensions (block 616), determine surface characteristics (block 624), or validate transfers (block 626) for multiple objects in the object stack. The subsequent image data obtained in block 614 may include a first subsequent image (e.g., the second image 504 in FIG. 5B) and a second subsequent image. The first subsequent image is captured after a first object has been transferred from the object stack (e.g., the object 402-4) and the second subsequent image is captured after a second object has been transferred from the object stack (e.g., the object 402-5). The robotic system 100 may perform one or more of the steps 614 through 630 of the method 600 by comparing the first subsequent image of block 614 and the initial image data of block 604 for the first transferred object. The robotic system 100 may further perform operations of blocks 614 through 630 of the method 600 by comparing the second subsequent image of block 614 and the initial image data of block 604 for the second transferred object. Furthermore, the subsequent image data obtained in block 614 may include a subsequent image that is captured after multiple objects have been transferred from the object stack (e.g., the objects 402-4 and 402-5). The robotic system 100 may perform the one or more operations of the blocks 614 through 630 of the method 600 by comparing such subsequent image to the initial image data of block 604 for obtaining any of the multiple objects that have been transferred. The one or more operations of the blocks 614 through 630 may be performed iteratively for each of the multiple transferred objects. For example, the robotic system 100 first derives dimensions for a first object and repeats deriving the dimensions for the second object, etc. Alternatively, the robotic system 100 can reset the subsequent image (from block 614) of the preceding iteration as the initial image (for block 604) for the current iteration.

In some embodiments, various aspects or portions of the method 600 may be performed by different modules, processes, threads, hardware circuits, or the like. For example, blocks 604-613 can be iteratively implemented by a first system (e.g., a module, a process, a thread, a circuit, or a combination thereof) to transfer a set of one or more objects per each iteration. A second system can implement blocks 614-630 in parallel. The second module/process/circuit can use the operations of block 614 to establish a before-after sequence between two sets of image data as the first system iteratively obtains images in detecting and transferring objects. In one or more embodiments, the second system can include the controller that uses the object detection images to additionally verify task statuses and object dimensions.

Embodiments

In accordance with some embodiments, a method of operating a robotic system includes obtaining preceding image data of a start location and/or a task location (e.g., the first image in FIG. 5A) for transferring objects from the start location to the task location. The preceding image data correspond to a top view (e.g., a top view of the stack 400) and include first depth measures corresponding to heights of an object stack (e.g., height $H_S$ of the object stack 400 in FIG. 4A) at the start location and/or the task location. The method includes obtaining subsequent image data of the start location and/or the task location (e.g., the second image in FIG. 5B) that depicts the start location and/or the task location after transfer of one or more objects of (e.g., to or from) the object stack (e.g., the object 402-4 shown in FIG. 5A has been removed in FIG. 5B). The subsequent image data correspond to the top view and include second depth measures corresponding to heights of the object stack after transfer of the one or more objects of the object stack. The method includes determining at least one transferred object and corresponding detection data from a tracking history based on the preceding image data and the subsequent image data. For example, the robotic system 100 determines that the object 402-4 was transferred from the start location to the task location. The at least one transferred object represents the one or more objects that were transferred between the preceding image data and the subsequent image data. The detection data corresponding to an object include information about object identifiers (e.g., a code associated with the identifier) and/or estimated start locations of the object at the start location. The method includes identifying one or more comparison locations (e.g., the comparison locations 'a'-'d' in FIGS. 5A and 5B) based on the at least one transferred object determined from the tracking history. The one or more comparison locations represent locations initially or subsequently occupied by the at least one transferred object (e.g., the comparison locations 'a'-'d' correspond to corners of the object 402-4 in FIG. 5A). The method includes deriving one or more dimensions of the at least one transferred object based on comparing the first depth measures and the second depth measures at the one or more comparison locations. For example, the one or more comparison locations include three locations and the one or more dimensions are derived based on comparing the first depth measures and the second depth measures only at the three comparison locations. The comparison does not include any other locations initially occupied by the at least one transferred object. The one or more dimensions include a height for each transferred object in the at least one transferred object. For example, the height of the object 402-4 is determined by extracting the depth measures at the comparison locations 'a'-'d' in FIG. 5A from the depth measure at the comparison locations 'a'-'d' in FIG. 5B.

In some embodiments, the one or more comparison locations correspond to corners and/or a mid-portion of a respective transferred object of the at least one transferred object (e.g., the comparison locations 'a'-'d' correspond to corners of the object 402-4 in FIG. 5A).

In some embodiments, the method further includes identifying surfaces and edges of the one or more objects of the object stack (e.g., surfaces and edges of the object stack 400 in FIG. 4B). The identifying includes retrieving, from the tracking history, information regarding objects (e.g., objects 402) registered to be at the start location at the time of collecting the preceding image data. The identifying further includes comparing the first depth measures corresponding to heights of the object stack in the preceding image data (e.g., depth measures corresponding to locations 'a'-'d' and 'i'-'k' in FIG. 5A) with the objects registered to be at the start location at the time of collecting the preceding image data to identify the surfaces and edges of the one or more objects of the object stack.

In some embodiments, identifying the surfaces or edges of the one or more objects of the object stack further includes determining a height of the object stack (e.g., height $H_S$ in FIG. 4A). Determining the height of the object stack includes determining, from the preceding image data, depth measures at discrete locations along a co-planar top surface of the object stack (e.g., locations 'a'-'d' and 'i'-'j' along the top surface of stack 400 in FIG. 5A). The preceding image data include a depth map or a point cloud representing distances between an imaging system (e.g., the imaging system 160 in FIG. 3) and surfaces depicted in the preceding image data (e.g., the surface 400-A of stack 400 in the image data 406). Determining the height further includes determining, from the subsequent image data, depth measures at discrete locations along a top surface of a placement platform (e.g., locations 'e'-'h' along the placement platform 404) where the object stack was positioned before transferring the objects of the object stack. Identifying the height also includes comparing the depth measures along the co-planar top surface of the object stack (e.g., the depth measures at locations 'a'-'d') and the depth measures along the top surface of the placement platform (e.g., the depth measures at locations 'e'-'h') to determine the height of the object stack.

In some embodiments, identifying the surfaces or edges of the object stack further includes identifying outlines of lateral surfaces of the one or more objects in the object stack (e.g., surfaces 402-1A, 402-2A, and 402-3A of the objects 402-1, 402-2, and 402-3, respectively, of the object stack 400 in FIG. 4B). Identifying the outlines includes retrieving, from a memory associated with the robotic system, data including generic primitives corresponding to outline shapes of expected object shapes. Identifying the outlines also includes comparing the depth measures at the discrete locations along the co-planar top surface of the object stack (e.g., locations 'a'-'d' and 'i'-'j' in FIG. 5A) to the generic primitives to identify the outlines of the lateral surfaces of the one or more objects in the object stack.

In some embodiments, identifying the one or more comparison locations (e.g., locations 'a'-'d' and 'i'-'j' in FIG.

5A) includes identifying corners and/or a mid-portion of a respective transferred object of the at least one transferred object based on the identified outlines of the lateral surfaces of the one or more objects in the object stack.

In some embodiments, the method further includes identifying a gap between two adjacent objects of the one or more objects of the object stack (e.g., the gap 408 between objects 402-1A and 402-2A in the inset of FIG. 4B). Identifying the gap includes determining, from the preceding image data, depth measures at discrete locations along a surface of the object stack (e.g., locations '$n_1$,' '$n_2$,' and '$n_3$' along the surface 400-A of the stack 400 in FIG. 4B). The discrete locations include a first location, a second location, and a third location. The second location is adjacent to, and located between, the first location and the third location. The preceding image data includes a depth map or a point cloud representing distances between an imaging system and surfaces depicted in the preceding image data. The method includes determining differences between the depth measures at the first location, the second location, and the third location. The method includes determining, in accordance with a determination that a depth measure at the second location is greater than a depth measure at the first location and a depth measure at the third location by more than a threshold depth value, that the second location corresponds to the gap between the two adjacent objects. For example, in an instance where the depth measure at location '$n_2$' is greater than the depth measures at the locations '$n_1$' and '$n_3$,' the robotic system 100 determines that the location '$n_2$' corresponds to a gap (e.g., the gap 408) between the adjacent objects 402-1A and 402-2A in FIG. 4B.

In some embodiments, identifying the surfaces or edges of the object stack includes analyzing the preceding image (e.g., the first image 502 in FIG. 5A) of the start location to identify the surfaces or edges of the object stack. The preceding image data includes a visual two-dimensional image depicting the top view of the start location.

In some embodiments, determining the at least one transferred object based on the preceding image data and the subsequent image data includes determining differences between the first depth measures of the preceding image data and the second depth measures of the preceding image data. The first depth measures and the second depth measures are collected from a particular area (e.g., the location 1 corresponding to the position of the object 402-4 in FIG. 5A) at the start location including the object stack. The method includes determining, in accordance with a determination that there is a difference between the first depth measures and the second measures that is above a threshold (e.g., a nominal threshold corresponding to a typical measurement uncertainty), that at least one object has been transferred away from the object stack at the start location. The method also includes determining, in accordance with a determination that the difference between the first depth measures and the second depth measures is below the threshold, that no objects have been transferred away from the particular area at the object stack at the start location.

In some embodiments, the detection data corresponding to the at least one transferred object include information about object identifiers (e.g., a unique identifier such as an identification code associated with an object) and/or estimated start locations associated with the at least one transferred object.

In some embodiments, determining the at least one transferred object from the tracking history includes determining a first time stamp associated with the preceding image data (e.g., the first image 502 in FIG. 5A) and a second time stamp associated with the subsequent image data (e.g., the second image 504 in FIG. 5B). The method includes comparing the first time stamp and the second time stamp with the tracking history including time stamps indicating when objects have been transferred. For example, the robotic system 100 determines the identifications of the objects that were expected to be transferred between the first time stamp and the second time stamp.

In some embodiments, the preceding image data and/or the subsequent image data include three-dimensional depth maps of the start location and/or the task location.

In some embodiments, the method further includes calculating a slope between two comparison locations (e.g., locations 'i' and 'k' along an object surface corresponding to location 2 in FIGS. 5A and 5B) of the one or more comparison locations at the preceding image data and the subsequent image data for determination of surface characteristics associated with the respective object. For example, the two comparison locations correspond to locations that were adjacent to the object 402-4 before the object 402-4 was removed from the object stack 400. The method includes determining whether a difference in the slope between the two comparison locations calculated from the preceding image data and the subsequent image data remains within a threshold value (e.g., a nominal threshold corresponding to a typical measurement uncertainty). The method also includes determining, in accordance with a determination that the difference in the slope between the two comparison locations calculated from the preceding image data and the subsequent image data remains within the threshold value, that the respective object remains undamaged after transferring. The method further includes determining, in accordance with a determination that the difference in the slope between the two comparison locations calculated from the preceding image data and the subsequent image data is greater than the threshold value, that the respective object is damaged after transferring. For example, if the slope calculated between the locations 'i' and 'k' on the top surface of the object 402-5 positioned at the location 2 in FIG. 5B is greater than the threshold value, the robotic system 100 determines that the object 402-5 is crushed after the object 402-4 was removed from the object stack 400.

In some embodiments, deriving the height for the each transferred object in the at least one transferred object includes deriving, for a respective transferred object of the at least one transferred object, a first height from a first comparison location (e.g., comparison location 'a' at the location 1 in FIG. 5B that was originally occupied by the object 402-4 in FIG. 5A) and a second height distinct from a second comparison location (e.g., comparison location 'b' at the location 1 in FIG. 5B that was originally occupied by the object 402-4 in FIG. 5A). The method includes determining a difference between the first height and the second height. The method includes, in accordance with a determination that the difference between the first height and the second height is below a predetermined threshold height difference, averaging the first height and the second height to derive the height for the respective transferred object. For example, when the difference between the heights measured at the comparison locations 'a' and 'b' is below a nominal threshold corresponding to a measurement error of the depth measurements, then the robotic system 100 determines that the locations 'a' and 'b' in FIG. 5B correspond to a co-planar surface. In such an instance, the robotic system determines the height of the transferred object based on the average of the heights measured at the comparison locations 'a' and 'b' in FIG. 5B. The method includes, in accordance with a determination that the difference between the first height and the second height is above the predetermined threshold height difference, assigning a lower of the first height and the second height to be the height of the respective transferred object. For example, when the difference between the heights measured at the comparison locations 'a' and 'b' is greater than the nominal threshold, then the robotic system 100 determines that the locations 'a' and 'b' in FIG. 5B do not correspond to a co-planar surface. Such instance may correspond, for example, to an instance where the object 402-4 has been placed on top of two different objects having different heights (e.g., the location 'a' in FIG. 5B corresponds to an object having a greater height and the location 'b' corresponds to an object having a lower height). In such an instance, the robotic system determines the height of the transferred object based on the lower one of the heights measured at the comparison locations 'a' and 'b' in FIG. 5B.

In some embodiments, the method further includes determining a center of mass (e.g., CoM location 506 in FIGS. 5A-5B) for each transferred object in the at least one transferred object. The center of mass is determined based on the weights of the at least one transferred object and the torque vectors of the at least one transferred object. The method also includes deriving, the one or more dimensions of the at least one transferred object based on the center of mass for each transferred object.

In some embodiments, the method includes determining a center of mass for the at least one transferred object (e.g., CoM location 506 in FIGS. 5A-5B). The center of mass is determined based on (1) a weight of the respective transferred object and/or (2) one or more torque vectors of the at least one transferred object as measured during transfer of the at least one transferred object. The method includes identifying a set (e.g., three or more) of support locations surrounding the center of mass. The three support locations correspond to locations that have shortest depth measures (e.g., highest points) from a plurality of depth measures along a non-planar surface where the at least one transferred object was initially positioned (e.g., before transfer). The set of support locations can be identified according to one or more spatial requirements (e.g., being located opposite at least two axes intersecting at the CoM location). The method includes averaging the depth measures at the three support locations to derive a height of the at least one transferred object. The method may further include (1) estimating a slope or a grade of a bottom surface of the at least one transferred object and (2) using the estimated slope to calculate the height of the at least one transferred object.

In accordance with some embodiments, the method includes obtaining first image data (e.g., the first image 502 in FIG. 5A) of a start location for transferring objects from the start location to a task location. The first image data correspond to a top view and include first depth measures corresponding to heights of an object stack at the start location. The method includes obtaining second image data (e.g., the second image 504 in FIG. 5B) of the start location. The second image data correspond to the top view and include second depth measures corresponding to heights of the object stack after transfer of a first object of the object stack. The method includes obtaining third image data of the start location (e.g., the robotic system 100 repeats obtaining image data of the start location sequentially while objects are being transferred from the stack 400). The third image data correspond to the top view and include third depth measures corresponding to heights of the object stack after transfer of the first object and a second object of the object stack. The method includes determining a height of the first object by identifying a first set of comparison locations representing locations initially occupied by the first object (e.g., locations 'a'-'d' at location 1 corresponding to the object 402-4 in FIG. 4A). The method includes deriving a height of the first transferred object based on comparing the first depth measures and the second depth measures at the first set of comparison locations representing the locations initially occupied by the first object. The method includes determining a height of the second object by identifying a second set of comparison locations representing locations initially occupied by the second object (e.g., locations 'i'-'k' at the location 2 corresponding to the object 402-5 in FIG. 5A). The method includes deriving a height of the second transferred object based on comparing the second depth measures and the third depth measures at the second set of comparison locations representing the locations initially occupied by the second object.

In accordance with some embodiments, a robotic system includes at least one processor, and at least one memory including processor-executable instructions for performing the method for operating a robotic system of the present disclosure.

In accordance with some embodiments, a non-transitory computer-readable medium includes processor instructions that, when executed by one or more processors, causes the one or more processors to perform the method for operating a robotic system of the present disclosure.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, either in this application or in a continuing application.

What is claimed is:

1. A method of operating a robotic system, the method comprising:
    obtaining preceding image data of a start location or a task location for transferring objects from the start location to the task location, wherein the preceding image data corresponds to a top view and includes first depth measures corresponding to heights of an object stack at the start location or the task location;
    obtaining subsequent image data of the start location or the task location that depict the start location or the task location after transfer of one or more objects from the object stack, wherein the subsequent image data-corresponds to the top view and includes second depth measures corresponding to heights of the object stack after transfer of the one or more objects of the object stack;
    determining at least one transferred object and corresponding detection data from a tracking history based on the preceding image data and the subsequent image data, wherein the at least one transferred object represents the one or more objects that were transferred between obtaining of the preceding image data and the subsequent image data;
    identifying one or more comparison locations based on the at least one transferred object, wherein the one or more comparison locations represent locations initially occupied by the at least one transferred object;
    deriving one or more dimensions of the at least one transferred object based on comparing the first depth measures and the second depth measures at the one or more comparison locations, including a height for each transferred object in the at least one transferred object, wherein deriving the height includes:
        deriving a first height from a first comparison location of the one or more comparison locations and a second height from a second comparison location of the one or more comparison locations, the second comparison location distinct from the first comparison location;
        determining a difference between the first height and the second height; and
        in accordance with a determination that the difference between the first height and the second height is below a predetermined threshold height difference, averaging the first height and the second height to derive the height for the respective transferred object, wherein the derived height is for providing heights of objects for subsequent transfer; and
    outputting instructions to the robotic system which cause the robotic system to perform the subsequent transfer based on the derived height.

2. The method of claim 1, wherein the one or more comparison locations correspond to corners or a mid-portion of a respective transferred object of the at least one transferred object.

3. The method of claim 1, further including determining a height of the object stack by:
    determining, from the preceding image data, depth measures at discrete locations along a co-planar top surface of the object stack, wherein the preceding image data include a depth map or a point cloud representing distances between an imaging system and surfaces depicted in the preceding image data;
    determining, from the subsequent image data, depth measures at discrete locations along a top surface of a placement platform where the object stack was positioned before transferring the objects of the object stack; and
    comparing the depth measures along the co-planar top surface of the object stack and the depth measures along the top surface of the placement platform to determine the height of the object stack.

4. The method of claim 1, further including identifying a gap between two adjacent objects of the one or more objects of the object stack by:
    determining, from the preceding image data, depth measures at discrete locations along a surface of the object stack, the discrete locations including a first location, a second location, and a third location, the second location being adjacent to and located between the first location and the third location, wherein the preceding image data include a depth map or a point cloud representing distances between an imaging system and surfaces depicted in the preceding image data;
    determining differences between the depth measures at the first location, the second location, and the third location; and
    in accordance with a determination that a depth measure at the second location is greater than a depth measure at the first location and a depth measure at the third location by more than a threshold depth value, determining that the second location corresponds to the gap between the two adjacent objects.

5. The method of claim 1, wherein determining the at least one transferred object based on the preceding image data and the subsequent image data includes:
    determining differences between the first depth measures of the preceding image data and the second depth measures of the preceding image data, wherein the first depth measures and the second depth measures are collected from a particular area at the start location including the object stack;
    in accordance with a determination that there is a difference between the first depth measures and the second measures that is above a threshold, determining that at least one object has been transferred away from the object stack at the start location.

6. The method of claim 1, wherein determining the at least one transferred object from the tracking history includes determining a first time stamp associated with the preceding image data and a second time stamp associated with the subsequent image data and comparing the first time stamp and the second time stamp with the tracking history including time stamps indicating when objects have been transferred.

7. The method of claim 1, wherein the preceding image data or the subsequent image data include three-dimensional depth maps of the start location or the task location.

8. The method of claim 1, further including:
    calculating a slope between two comparison locations of the one or more comparison locations at the preceding image data and the subsequent image data for determination of surface characteristics associated with the respective object;

determining whether a difference in the slope between the two comparison locations calculated from the preceding image data and the subsequent image data remains within a threshold value; and determining, in accordance with a determination that the difference in the slope between the two comparison locations calculated from the preceding image data and the subsequent image data remains within the threshold value, that the respective object remains undamaged after transferring.

9. The method of claim 1, wherein deriving the height for the at least one transferred object includes:

in accordance with a determination that the difference between the first height and the second height is above the predetermined threshold height difference, assigning a lower of the first height and the second height to be the height of the respective transferred object.

10. The method of claim 1, including:

determining a center of mass for the at least one transferred object based on a weight of the respective transferred object and torque vectors of the at least one transferred object, identifying three support locations surrounding the center of mass, the three support locations corresponding to locations that have shortest depth measures from a plurality of depth measures along on a non-planar surface where the at least one transferred object was positioned before being transferred, and averaging the depth measures at the three support locations to derive a height of the at least one transferred object.

11. A robotic system comprising:

at least one processor;

at least one memory including processor-executable instructions for:

obtaining preceding image data of a start location or a task location for transferring objects from the start location to the task location, wherein the preceding image data corresponds to a top view and includes first depth measures corresponding to heights of an object stack at the start location or the task location;

obtaining subsequent image data of the start location or the task location that depict the start location or the task location after transfer of one or more objects of the object stack, wherein the subsequent image data corresponds to the top view and includes second depth measures corresponding to heights of the object stack after transfer of the one or more objects of the object stack;

determining at least one transferred object and corresponding detection data from a tracking history based on the preceding image data and the subsequent image data, wherein the at least one transferred object represents the one or more objects that were transferred between the preceding image data and the subsequent image data;

identifying one or more comparison locations based on the at least one transferred object determined from the tracking history, wherein the one or more comparison locations represent locations initially occupied by the at least one transferred object;

deriving one or more dimensions of the at least one transferred object based on comparing the first depth measures and the second depth measures at the one or more locations, including a height for each of the at least one transferred object, wherein deriving the height includes:

deriving a first height from a first comparison location of the one or more comparison locations and a second height from a second comparison location of the one or more comparison locations, the second comparison location distinct from the first comparison location;

determining a difference between the first height and the second height; and in accordance with a determination that the difference between the first height and the second height is below a predetermined threshold height difference, averaging the first height and the second height to derive the height for the respective transferred object, wherein the derived height is for providing heights of objects for subsequent transfer; and outputting instructions to the robotic system which cause the robotic system to perform the subsequent transfer based on the derived height.

12. The system of claim 11, wherein the one or more comparison locations correspond to corners or a mid-portion of a respective transferred object of the at least one transferred object.

13. The system of claim 11, wherein the at least one memory includes processor-executable instructions for:

identifying a gap between two adjacent objects of the one or more objects of the object stack by:

determining, from the preceding image data, depth measures at discrete locations along a surface of the object stack, the discrete locations including a first location, a second location, and a third location, the second location being adjacent to and located between the first location and the third location, wherein the preceding image data includes a depth map or a point cloud representing distances between an imaging system and surfaces depicted in the preceding image data;

determining differences between the depth measures at the first location, the second location, and the third location; and in accordance with a determination that a depth measure at the second location is greater than a depth measure at the first location and a depth measure at the third location by more than a threshold depth value, determining that the second location corresponds to the gap between the two adjacent objects.

14. The system of claim 11, wherein the at least one memory includes processor-executable instructions for:

calculating a slope between two comparison locations of the one or more comparison locations at the preceding image data and the subsequent image data for determination of surface characteristics associated with the respective object;

determining whether a difference in the slope between the two comparison locations calculated from the preceding image data and the subsequent image data remains within a threshold value; and determining, in accordance with a determination that the difference in the slope between the two comparison locations calculated from the preceding image data and the subsequent image data remains within the threshold value, that the respective object remains undamaged after transferring.

15. The system of claim 11, wherein the at least one memory includes processor-executable instructions for:

determining a center of mass for the at least one transferred object based on a weight of the respective transferred object and torque vectors of the at least one transferred object, identifying three support locations surrounding the center of mass, the three support locations corresponding to locations that have shortest depth measures from a plurality of depth measures along on a non-planar surface where the at least one transferred object was positioned before being transferred, and averaging the depth measures at the three support locations to derive a height of the at least one transferred object.

16. A non-transitory computer readable medium including processor instructions that, when executed by one or more processors, causes the one or more processors to:

obtain preceding image data of a start location or a task location for transferring objects from the start location to the task location, wherein the preceding image data corresponds to a top view and includes first depth measures corresponding to heights of an object stack at the start location or the task location;

obtain subsequent image data of the start location or the task location that depict the start location or the task location after transfer of one or more objects of the object stack, wherein the subsequent image data corresponds to the top view and includes second depth measures corresponding to heights of the object stack after transfer of the one or more objects of the object stack;

determine at least one transferred object and corresponding detection data from a tracking history based on the preceding image data and the subsequent image data, wherein the at least one transferred object represents the one or more objects that were transferred between the preceding image data and the subsequent image data;

identify one or more comparison locations based on the at least one transferred object determined from the tracking history, wherein the one or more comparison locations represent locations initially occupied by the at least one transferred object;

derive one or more dimensions of the at least one transferred object based on comparing the first depth measures and the second depth measures at the one or more locations, including a height for each of the at least one transferred object, wherein to derive of the height includes to:

derive a first height from a first comparison location of the one or more comparison locations and a second height from a second comparison location of the one or more comparison locations, the second comparison location distinct from the first comparison location;

determine a difference between the first height and the second height; and in accordance with a determination that the difference between the first height and the second height is below a predetermined threshold height difference, average the first height and the second height to derive the height for the respective transferred object, wherein the derived height is for providing heights of objects for subsequent transfer; and output instructions to the robotic system which cause the robotic system to perform the subsequent transfer based on the derived height.

17. The computer readable medium of claim 16, wherein the one or more comparison locations correspond to corners or a mid-portion of a respective transferred object of the at least one transferred object.

18. The computer readable medium of claim 16, further including processor instructions that causes the one or more processors to:

identify a gap between two adjacent objects of the one or more objects of the object stack by:

determine, from the preceding image data, depth measures at discrete locations along a surface of the object stack, the discrete locations including a first location, a second location, and a third location, the second location being adjacent to and located between the first location and the third location, wherein the preceding image data include a depth map or a point cloud representing distances between an imaging system and surfaces depicted in the preceding image data;

determine differences between the depth measures at the first location, the second location, and the third location; and in accordance with a determination that a depth measure at the second location is greater than a depth measure at the first location and a depth measure at the third location by more than a threshold depth value, determine that the second location corresponds to the gap between the two adjacent objects.

19. The computer readable medium of claim 16, further including processor instructions that causes the one or more processors to:

calculate a slope between two comparison locations of the one or more comparison locations at the preceding image data and the subsequent image data for determination of surface characteristics associated with the respective object;

determine whether a difference in the slope between the two comparison locations calculated from the preceding image data and the subsequent image data remains within a threshold value; and determine, in accordance with a determination that the difference in the slope between the two comparison locations calculated from the preceding image data and the subsequent image data remains within the threshold value, that the respective object remains undamaged after transferring.

20. The computer readable medium of claim 16, further including processor instructions that causes the one or more processors to:

determine a center of mass for the at least one transferred object based on a weight of the respective transferred object and torque vectors of the at least one transferred object, identify three support locations surrounding the center of mass, the three support locations corresponding to locations that have shortest depth measures from a plurality of depth measures along on a non-planar surface where the at least one transferred object was positioned before being transferred, and average the depth measures at the three support locations to derive a height of the at least one transferred object.

* * * * *